US010455477B2

(12) United States Patent
Shoshan et al.

(10) Patent No.: US 10,455,477 B2
(45) Date of Patent: *Oct. 22, 2019

(54) CELLULAR COMMUNICATION SYSTEM UTILIZING UPGRADED MOVING RELAYS AND METHODS USEFUL IN CONJUNCTION THEREWITH

(71) Applicant: ELTA SYSTEMS LTD., Ashdod (IL)

(72) Inventors: Yaakov Shoshan, Ashkelon (IL); Adi Schwartz, Holon (IL); Gil Koifman, Petach-Tikva (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,045

(22) Filed: May 16, 2016

(65) Prior Publication Data
US 2016/0345161 A1    Nov. 24, 2016

Related U.S. Application Data

(63) Continuation of application No. 14/004,222, filed as application No. PCT/IL2012/050072 on Mar. 8, 2012, now Pat. No. 9,369,941.
    (Continued)

(51) Int. Cl.
*H04W 40/22*    (2009.01)
*H04W 76/10*    (2018.01)
    (Continued)

(52) U.S. Cl.
CPC .......... *H04W 40/22* (2013.01); *H04B 7/1555* (2013.01); *H04B 7/15542* (2013.01);
    (Continued)

(58) Field of Classification Search
CPC ... H04W 40/22; H04W 8/085; H04W 76/022; H04W 72/0453; H04W 40/02;
    (Continued)

(56) References Cited

U.S. PATENT DOCUMENTS 5,657,317 A    8/1997 Mahany et al.
5,729,826 A    3/1998 Gavrilovich
    (Continued)

FOREIGN PATENT DOCUMENTS

WO    2010087687 A2    8/2010
WO    2011092689 A1    8/2011
    (Continued)

OTHER PUBLICATIONS

"Multiple-Broadcast Single-Frequency Network", Wikipedia, http://en.wikipedia.org/w/index.php?title=Multicast-broadcast_singlefrequency_network&oldid=474160489, Jan. 31, 2012.
    (Continued)

*Primary Examiner* — Dinh Nguyen
(74) *Attorney, Agent, or Firm* — Oliff PLC

(57) ABSTRACT

A moving cellular communication system comprising at least one upgraded moving relay including at least two base station functionalities and at least one mobile station functionality and a relay resource manager, all co-located, wherein each base station functionality from among the at least two base station functionalities of the upgraded moving relay is operative to communicate via antennae with at least one mobile station thereby to define a first radio link therebetween, and wherein each base station functionality has a connection to its co-located relay resource manager, wherein each mobile station functionality of the upgraded moving relay communicates via antennae with a unit which has base station functionality thereby to define at least one second radio link, respectively, wherein the relay resource manager in each individual moving relay comprises a radio resource manager; and functionality for exchanging information with relay resource managers is included in moving relays other than the individual moving relay.

27 Claims, 13 Drawing Sheets

Related U.S. Application Data

(60) Provisional application No. 61/451,166, filed on Mar. 10, 2011.

(51) Int. Cl.

| | | |
|---|---|---|
| *H04W 4/90* | (2018.01) | |
| *H04W 76/12* | (2018.01) | |
| *H04W 8/26* | (2009.01) | |
| *H04W 72/04* | (2009.01) | |
| *H04W 28/02* | (2009.01) | |
| *H04W 36/04* | (2009.01) | |
| *H04W 72/02* | (2009.01) | |
| *H04B 7/155* | (2006.01) | |
| *H04B 7/26* | (2006.01) | |
| *H04W 72/00* | (2009.01) | |
| *H04W 8/08* | (2009.01) | |
| *H04J 11/00* | (2006.01) | |
| *H04L 1/00* | (2006.01) | |
| *H04W 28/14* | (2009.01) | |
| *H04W 40/02* | (2009.01) | |
| *H04W 76/11* | (2018.01) | |
| *H04W 4/40* | (2018.01) | |
| *H04W 4/04* | (2009.01) | |
| *H04L 29/12* | (2006.01) | |
| *H04W 40/00* | (2009.01) | |
| *H04W 80/04* | (2009.01) | |
| *H04W 84/00* | (2009.01) | |
| *H04W 84/04* | (2009.01) | |
| *H04W 88/04* | (2009.01) | |
| *H04W 88/08* | (2009.01) | |
| *H04W 88/16* | (2009.01) | |

(52) U.S. Cl.
CPC .......... *H04B 7/2606* (2013.01); *H04J 11/005* (2013.01); *H04J 11/0056* (2013.01); *H04L 1/0018* (2013.01); *H04L 61/2517* (2013.01); *H04W 4/046* (2013.01); *H04W 4/40* (2018.02); *H04W 4/90* (2018.02); *H04W 8/085* (2013.01); *H04W 8/26* (2013.01); *H04W 28/0215* (2013.01); *H04W 28/0268* (2013.01); *H04W 28/14* (2013.01); *H04W 36/04* (2013.01); *H04W 40/02* (2013.01); *H04W 72/005* (2013.01); *H04W 72/02* (2013.01); *H04W 72/042* (2013.01); *H04W 72/0413* (2013.01); *H04W 72/0453* (2013.01); *H04W 76/10* (2018.02); *H04W 76/11* (2018.02); *H04W 76/12* (2018.02); *H04L 2212/00* (2013.01); *H04W 40/00* (2013.01); *H04W 72/00* (2013.01); *H04W 80/04* (2013.01); *H04W 84/005* (2013.01); *H04W 84/045* (2013.01); *H04W 84/047* (2013.01); *H04W 88/04* (2013.01); *H04W 88/08* (2013.01); *H04W 88/16* (2013.01)

(58) Field of Classification Search
CPC ... H04W 8/26; H04W 4/046; H04W 72/0413; H04W 88/08; H04W 28/0268; H04W 88/16; H04W 88/04; H04W 72/042; H04W 28/14; H04W 76/12; H04W 4/90; H04W 76/11; H04W 4/40; H04W 76/10; H04W 28/0215; H04W 36/04; H04W 72/005; H04W 72/02; H04W 40/00; H04W 72/00; H04W 80/04; H04W 84/005; H04W 84/045; H04W 84/047; H04L 1/0018; H04L 61/2517; H04L 2212/00; H04J 11/0056; H04J 11/005; H04B 7/15542; H04B 7/1555; H04B 7/2606

See application file for complete search history.

(56) References Cited

U.S. PATENT DOCUMENTS

| | | | |
|---|---|---|---|
| 6,278,881 | B1 | 8/2001 | Balck |
| 6,408,005 | B1 | 6/2002 | Fan et al. |
| 7,383,049 | B2 | 6/2008 | Deloach, Jr. et al. |
| 7,471,626 | B2 | 12/2008 | Naghian et al. |
| 2004/0092258 | A1 | 5/2004 | Hibbs et al. |
| 2004/0136345 | A1 | 7/2004 | Yano et al. |
| 2005/0088972 | A1 | 4/2005 | Zhang et al. |
| 2005/0255851 | A1 | 11/2005 | Schreiber |
| 2006/0079280 | A1* | 4/2006 | LaPerch ............ H04L 29/06027 455/557 |
| 2006/0193295 | A1* | 8/2006 | White ................. H04L 12/5692 370/336 |
| 2006/0227742 | A1 | 10/2006 | Furukawa |
| 2008/0031197 | A1 | 2/2008 | Wang et al. |
| 2008/0112362 | A1* | 5/2008 | Korus ............... H04L 29/12811 370/331 |
| 2008/0227434 | A1* | 9/2008 | Nitta .................. H04B 7/18506 455/414.1 |
| 2008/0268833 | A1 | 10/2008 | Huang et al. |
| 2009/0190522 | A1* | 7/2009 | Horn ................... H04W 40/248 370/315 |
| 2009/0201867 | A1 | 8/2009 | Teo et al. |
| 2009/0312030 | A1 | 12/2009 | Lee et al. |
| 2010/0104001 | A1 | 4/2010 | Lee et al. |
| 2010/0220645 | A1 | 9/2010 | Kwon et al. |
| 2010/0234071 | A1 | 9/2010 | Shabtay et al. |
| 2010/0254351 | A1 | 10/2010 | Wang et al. |
| 2010/0297937 | A1 | 11/2010 | Kim |
| 2011/0007707 | A1 | 1/2011 | Kazmi |
| 2011/0034212 | A1 | 2/2011 | Gavrilovich |
| 2011/0038284 | A1 | 2/2011 | Senarath et al. |
| 2012/0315916 | A1 | 12/2012 | Van Phan et al. |
| 2014/0204832 | A1* | 7/2014 | Van Phan ............. H04W 88/10 370/315 |

FOREIGN PATENT DOCUMENTS

| | | | |
|---|---|---|---|
| WO | 2011092698 | A1 | 8/2011 |
| WO | 2012070044 | A1 | 5/2012 |
| WO | 2012070045 | A2 | 5/2012 |
| WO | 2012070048 | A1 | 5/2012 |
| WO | 2012070049 | A1 | 5/2012 |
| WO | 2012120515 | A2 | 9/2012 |
| WO | 2012120519 | A1 | 9/2012 |

OTHER PUBLICATIONS

"Multimedia Broadcast Multicast Service", Wikipedia, http://en.wikipedia.org/w/index.php?title=Multimedia_Broadcast_Multicast_Service&oldid=462172966.

IBM "User Interface for Controlling and Originating One-to-One, One-to-Many, Many-to-One, and Many-to-Many Communication Sessions", Jun. 11, 2004.

"3rd Generation Partnership Project; Technical Specification Group Radio Access Network; Evolved Universal Terrestrial Radio Access (E-UTRA); Relay Architectures for E-UTRA (LTE-Advanced)", 3GPP TR 36.806, Mar. 2010, pp. 1-34, vol. 9.

"The Mobile Broadband Standard", http://www.3gpp.org/specifications, Feb. 2012.

* cited by examiner

CELLULAR COMMUNICATION SYSTEM UTILIZING UPGRADED MOVING RELAYS AND METHODS USEFUL IN CONJUNCTION THEREWITH

REFERENCE TO CO-PENDING APPLICATIONS

Priority is claimed from:

U.S. Patent Application No. 61/451,166 "Cellular communication system utilizing upgraded moving relays" filed 10 Mar. 2011; and Israel Patent Application No. 218046, "A multi-directional relay architecture and apparatus and methods of operation useful in conjunction therewith", filed 12 Feb. 2012.

FIELD OF THE INVENTION

This application relates to architecture and data transmission methods for use in hierarchal cellular networks.

BACKGROUND OF THE DISCLOSURE

Multi-layer hierarchical dynamic cellular networks pose difficulties for traffic flow and management.

A classical cellular network includes or consists of a core segment and Radio Access Network (RAN). The Radio Access Network (RAN) is comprised of base stations (BS) and mobile stations (MS). Each of the mobile stations is typically connected to one of the Base Stations (FIG. 2).

A hierarchal cellular network (FIG. 1a) is comprised of a classical cellular network, however the Radio Access Network (RAN) segment enables direct connection between base stations so that one base station is capable of relaying the traffic of the other base station to the core segment or to other base stations in a higher layer, which are connected to the core segment.

Multi-layer hierarchical dynamic cellular networks pose difficulties for traffic flow and management (e.g. the multi protocol-layers handling). These difficulties may occur since the base LTE protocols and core elements do not support this type of network topology.

The disclosures of all publications and patent documents mentioned in the specification, and of the publications and patent documents cited therein directly or indirectly, are hereby incorporated by reference.

SUMMARY OF THE DISCLOSURE

Certain embodiments of the presently disclosed subject matter seek to provide a cellular communication system utilizing upgraded moving relays.

Certain embodiments of the present invention seek to provide a way to enlarge backhauling bandwidth capacity by using a number of mobile station functionalities as backhauling devices.

Certain embodiments of the present invention seek to provide a way to enlarge the number of backhauling bearers by using a number of mobile station functionalities as backhauling devices.

Certain embodiments of the present invention seek to provide a way to improve data diversity by sending data in multiple paths using a number of mobile station functionalities as backhauling devices.

Certain embodiments of the present invention seek to provide way to initialize handover by using several UEs as backhauling devices.

Certain embodiments of the present invention relate to a relay station that comprises a standard base station and several mobile handsets that serve as mobile backhauling links.

In accordance with an aspect of the presently disclosed subject matter, there is provided a moving cellular communication system comprising at least one upgraded moving relay including at least two base station functionalities and/or at least two mobile station functionalities and a radio manager, all co-located, wherein each base station functionality from among the at least two base station functionalities of the upgraded moving relay is operative to communicate via antennae with at least one mobile station thereby to define a first radio link therebetween, and wherein each base station functionality has a connection to its co-located radio manager, wherein each mobile station functionality from among the at least two mobile station functionalities of the upgraded moving relay communicates via antennae with a unit which has base station functionality thereby to define second radio links, respectively, wherein the radio manager in each individual moving relay comprises a radio resource manager; and functionality for exchanging information with radio managers is included in moving relays other than the individual moving relay.

In accordance with an embodiment of the presently disclosed subject matter, there is further provided a system, wherein at least two of the second radio links communicate with units having base station functionality, located in different geographic locations.

In accordance with an embodiment of the presently disclosed subject matter, there is yet further provided a system, wherein the network utilizing bearers serve for conveying communication from a mobile station through a communication route to the core of the cellular communication system, and wherein the upgraded moving relays support a larger number of bearers compared to a moving relay having one base station functionality and one mobile station functionality, while utilizing the at least two mobile station functionalities.

In accordance with an embodiment of the presently disclosed subject matter, there is yet further provided a system, wherein the at least two mobile station functionalities operate substantially simultaneously.

In accordance with an embodiment of the presently disclosed subject matter, there is yet further provided a system, wherein the at least two base station functionalities operate substantially simultaneously.

In accordance with an embodiment of the presently disclosed subject matter, there is yet further provided a system, wherein the unit which has a base station functionality is a base station.

In accordance with an embodiment of the presently disclosed subject matter, there is yet further provided a system, wherein the unit which has a base station functionality forms part of a moving relay.

In accordance with an embodiment of the presently disclosed subject matter, there is yet further provided a system, wherein the unit which has a base station functionality forms part of the upgraded moving relay.

In accordance with an embodiment of the presently disclosed subject matter, there is yet further provided a system, wherein the network further comprises at least one moving relay having one base station functionality and one mobile station functionality.

In accordance with an embodiment of the presently disclosed subject matter, there is yet further provided a system, wherein at least two of the second radio links of an upgraded moving relay communicate substantially identical data.

In accordance with an embodiment of the presently disclosed subject matter, there is yet further provided a system, wherein at least two of the second radio links of an upgraded moving relay communicate substantially identical data.

In accordance with an embodiment of the presently disclosed subject matter, there is yet further provided a system, wherein at least one of the second radio links serves for communicating control data and at least the other of the second radio links serves for communicating user data.

In accordance with an embodiment of the presently disclosed subject matter, there is yet further provided a system, wherein at least one of the mobile station functionalities within an upgraded moving relay serves as a backup to other mobile station functionality of the same upgraded moving relay, and the radio manager is operative to switch communication from the other mobile station functionality to the backup mobile station functionality in response to meeting a mobile station handover criterion.

In accordance with an embodiment of the presently disclosed subject matter, there is yet further provided a system, wherein at least one of the base station functionalities within an upgraded moving relay serves as a backup to other base station functionalities of the same upgraded moving relay, and the radio manager is operative to seamlessly switch communication from the other base station functionality to the backup base station functionality in response to meeting a base station handover criterion.

The subject matter of the invention further contemplates a counterpart method and corresponding embodiments, mutatis mutandis.

Certain embodiments of the present invention relate to a relay station that comprises a standard base station and several mobile handsets that serve as a mobile backhauling link.

The following terms may be construed either in accordance with any definition thereof appearing in the prior art literature or in accordance with the specification, or as follows:

access link: a bi-directional link between a relay node (RN) base station functionality and a mobile station (MS) served thereby or between a base station and a mobile station served thereby. It typically has an uplink portion and a downlink portion, both uni-directional.

Backhaul data: data being transferred, typically bi-directionally, over at least one backhauling link.

Backhauling link: bi-directional link other than an access link e.g. link between relays in adjacent levels or link between relay and static base station or link between relays and relay proxy or link between base station functionality or static base station or relay proxy and core. More generally, a backhauling link bi-directionally links distributed sites to each other or links access points e.g. base stations and a more centralized point e.g. a core. Typically a backhauling link has an uplink portion and a downlink portion, both uni-directional.

base station: one of a plurality of stationary or mobile nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base stations and mobile communication devices.

base station functionality: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base stations and mobile communication devices.

bi-directional link: a link between levels of a hierarchical communication network which includes both an uplink and a downlink. cell: base station.

core: server in a cellular communication system that: (1) connects between MSs that are attached to the same core; and/or (2) connects between MSs that are attached to one core with MSs that are attached to a different core; and/or (3) connects MSs attached to the core to other servers such as an Internet server, terrestrial communication network servers, video servers, gaming servers (not shown).

Core Network: synonym for "core" or core plus network linked thereto.

Ctrl: e.g. as per LTE protocol.

donor: serving relationship e.g. a base station serving e.g. a relay node.

Downlink (DL): a uni-directional portion of a link e.g. backhauling or access link from a relay's base station functionality or static base station to a mobile station functionality or mobile station. DL UE or Downlink (DL) UE: downlink to a user entity via a sequence of at least one relay e.g. as shown in FIG. 3.

down-stream (DS): flow of data from a higher point at the topology (closer to the core) to a lower point at the topology (further from the core).

eNB: base station, or base station functionality e.g. in a relay, which uses LTE protocol. Also termed herein "LTE base station".

GTP: a group of IP-based communications protocols used to carry General Packet Radio Service (GPRS) within GSM, UMTS and LTE networks.

GTP bearer: A bearer using a GTP protocol.

GTP tunnel: A tunnel using a GTP protocol.

Link: Telecommunications or radio link between nodes of a communication network. It is appreciated that a portion, typically uni-directional, of a typically bi-directional link is also sometimes termed a link. There may be one or more channels in a link, e.g. in LTE all the following channels are uplinks: PUCCH, PUSCH, PRACH.

MBSFN: A non-limiting example of a Downlink (DL)-only transmission protocol. According to Wikipedia, Multicast-Broadcast Single Frequency Network is a communication channel defined in LTE, the fourth-generation cellular networking standard, which may deliver services such as mobile TV using the LTE infrastructure. This enables network operators to offer mobile TV without the need for additional costly licensed spectrum and without requiring new infrastructure and end-user devices. There is no known commercial deployment of MBSFN.

According to Wikipedia, LTE's Enhanced Multimedia Broadcast Multicast Services (E-MBMS) provide transport features for sending the same content information to all the users in a cell (broadcast) or to a given set of users (subscribers) in a cell (multicast). In contrast, IP-level broadcast or multicast offer no sharing of resources on the radio access level. In E-MBMS it is possible to either use a single eNode-B or multiple eNode-Bs for transmission to multiple LTE mobile station (UE)s. MBSFN is the definition for the latter option.

According to Wikipedia, MBSFN is a transmission mode which exploits LTE's OFDM radio interface to send multicast or broadcast data as a multicell transmission over a synchronized single-frequency network (SFN). The transmissions from the multiple cells are sufficiently tightly synchronized for each to arrive at the LTE mobile station (UE) within the OFDM Cyclic Prefix (CP) so as to avoid Inter-Symbol Interference (ISI). In effect, this makes the MBSFN transmission appear to a LTE mobile station (UE) as a transmission from a single large cell, dramatically increasing the Signal-to-Interference Ratio (SIR) due to the absence of inter-cell interference [4].

MBMS: Multimedia Broadcast Multicast Service including some or all of the technology described in 3GPP TS 25.346.

mobile station or mobile communication device: a portable electronic device which communicates with other such devices or with a terrestrial network via a cellular communication network, typically including allowing users of such devices to converse and/or exchange digital information between them. The device may even comprise a dongle connected to a computer or sensor with no user nearby.

mobile station functionality: functionality, typically software implemented, residing on a relay which communicates with an antenna, transmitter and receiver to enable the relay or to function as a mobile communication device.

mobile station functionality: functionality, typically software implemented, residing on a relay or inverse relay (iRelay) Proxy which communicates with an antenna, transmitter and receiver to enable the relay or inverse relay (iRelay) Proxy to function as a mobile communication device. The mobile station functionality typically includes antenna, RF front-end, Modem (communications processor) but does not necessarily include an application processor nor appliances such as keyboard, screen, microphone, and speaker which serve a conventional mobile station.

Radio bearer, bearer: e.g. as per 3GPP terminology.

RE resource block: e.g. as per LTE standard or an adaptation thereof suitable for operation within communication standards other than LTE.

relay: a node in the cellular communication network equipped with an antenna, transmitter and receiver and functioning both as a mobile communication device and a base station and extending the coverage of the base-stations.

Relay link: link or radio segment between a relay node and a donor base station.

Segment: link.

Subframe: e.g. as per LTE protocol

Trans. Downlink (DL) backhauling: transmit backhauling using downlink.

Tunnel: as per protocols that enables tunneling such as but not limited to GRE and GPRS.

UE: user entity or mobile station or mobile communication device or mobile station functionality. e.g. in a relay, which uses LTE protocol. Also termed herein "LTE mobile station".

Uplink (UL): a uni-directional portion of a pair of links e.g. of backhauling or access links, from a relay's mobile station functionality or mobile device to a relay's base station functionality or static base station.

Uplink backhaul data: data being transferred uni-directionally, over only the uplink portion of at least one backhauling link, typically from a base station to a core or more generally from an access point to a more centralized point.

upstream (US): flow of data from a lower point in a network topology (i.e. further from the core) to a higher point in a network topology (i.e. closer to the core).

In accordance with an aspect of the presently disclosed subject matter, there is provided a moving cellular communication system comprising at least one upgraded moving relay including at least two base station functionalities and at least one mobile station functionality and a radio manager, all co-located, wherein each base station functionality from among the at least two base station functionalities of the upgraded moving relay is operative to communicate via antennae with at least one mobile station thereby to define a first radio link therebetween, and wherein each base station functionality has a connection to its co-located radio manager, wherein each mobile station functionality of the upgraded moving relay communicates via antennae with a unit which has base station functionality thereby to define at least one second radio link, respectively, wherein the radio manager in each individual moving relay comprises a radio resource manager, and functionality for exchanging information with radio managers is included in moving relays other than the individual moving relay.

In accordance with an aspect of the presently disclosed subject matter, there is further provided a moving cellular communication system comprising:

at least one upgraded moving relay including at least one base station functionality and at least two mobile station functionalities and a radio manager, all co-located, wherein each base station functionality of the upgraded moving relay is operative to communicate via antennae with at least one mobile station thereby to define at least one first radio link therebetween, and wherein each base station functionality has a connection to its co-located radio manager, wherein each mobile station functionality from among the at least two mobile station functionalities of the upgraded moving relay communicates via antennae with a unit which has base station functionality thereby to define at least two second radio links, respectively, wherein the radio manager in each individual moving relay comprises a radio resource manager, and functionality for exchanging information with radio managers is included in moving relays other than the individual moving relay.

In accordance with an embodiment of the presently disclosed subject matter, there is provided a moving cellular communication system wherein the at least one mobile station functionality includes at least two mobile station functionalities co-located with the base station functionalities and radio manager; wherein each mobile station functionality from among the at least two mobile station functionalities of the upgraded moving relay communicates via antennae with a unit which has base station functionality thereby to define at least two second radio links, respectively.

In accordance with an embodiment of the presently disclosed subject matter, there is yet further provided a system wherein the at least two mobile station functionalities operate substantially simultaneously.

In accordance with an embodiment of the presently disclosed subject matter, there is yet further provided a system wherein the at least two base station functionalities operate substantially simultaneously.

In accordance with an embodiment of the presently disclosed subject matter, there is yet further provided a system, wherein the unit which has a base station functionality being a base station.

In accordance with an embodiment of the presently disclosed subject matter, there is yet further provided a system, wherein the unit which has a base station functionality forms part of a moving relay.

In accordance with an embodiment of the presently disclosed subject matter, there is yet further provided a system, wherein the unit which has a base station functionality forms part of upgraded moving relay.

In accordance with an embodiment of the presently disclosed subject matter, there is yet further provided a system, wherein the network further comprising at least one moving relay having one base station functionality and one mobile station functionality.

In accordance with an embodiment of the presently disclosed subject matter, there is yet further provided a system, wherein at least two of the second radio links communicate with units having base station functionality, located in different geographic locations.

In accordance with an embodiment of the presently disclosed subject matter, there is yet further provided a system, wherein at least two of the second radio links of an upgraded moving relay communicate substantially identical data.

In accordance with an embodiment of the presently disclosed subject matter, there is yet further provided a system, wherein at least one of the second radio links serves for communicating control data and at least other of the second radio links serves for communicating user data.

In accordance with an embodiment of the presently disclosed subject matter, there is yet further provided a system, wherein at least one of the mobile station functionalities within an upgraded moving relay serves as a backup to other mobile station functionality of the same upgraded moving relay, and the radio manager is operative to switch communication from the other mobile station functionality to the backup mobile station functionality in response to meeting a mobile station handover criterion.

In accordance with an embodiment of the presently disclosed subject matter, there is yet further provided a system, wherein at least one of the base station functionalities within an upgraded moving relay serves as a backup to other base station functionality of the same upgraded moving relay, and the radio manager is operative to seamlessly switch communication from the other base station functionality to the backup base station functionality in response to meeting a base station handover criterion.

In accordance with an embodiment of the presently disclosed subject matter, there is yet further provided a system, wherein the network utilizing bearers serve for conveying communication from a mobile station through a communication route to the core of the cellular communication system, and wherein the upgraded moving relays supporting larger number of bearers compared to a moving relay have one base station functionality and one mobile station functionality, while utilizing the at least two mobile station functionalities.

In accordance with an embodiment of the presently disclosed subject matter, there is yet further provided a system, wherein at least two of the second radio links of an upgraded moving relay communicate substantially identical data.

In accordance with an aspect of the presently disclosed subject matter, there is yet further provided a method for providing moving cellular communication, the method comprising providing at least one upgraded moving relay including at least two base station functionalities and at least one mobile station functionality and a radio manager, all co-located, wherein each base station functionality from among the at least two base station functionalities of the upgraded moving relay is operative to communicate via antennae with at least one mobile station thereby to define a first radio link therebetween, and wherein each base station functionality has a connection to its co-located radio manager, wherein each mobile station functionality of the upgraded moving relay communicates via antennae with a unit which has base station functionality thereby to define at least one second radio link, respectively, wherein providing the radio manager in each individual moving relay comprises providing a radio resource manager; and providing functionality for exchanging information with radio managers included in moving relays other than the individual moving relay.

In accordance with an aspect of the presently disclosed subject matter, there is yet further provided a method for providing moving cellular communication, the method comprising providing at least one upgraded moving relay including at least one base station functionality and at least two mobile station functionalities and a radio manager, all co-located, wherein each base station functionality of the upgraded moving relay is operative to communicate via antennae with at least one mobile station thereby to define at least one first radio link therebetween, and wherein each base station functionality has a connection to its co-located radio manager, wherein each mobile station functionality from among the at least two mobile station functionalities of the upgraded moving relay communicates via antennae with a unit which has base station functionality thereby to define at least two second radio links, respectively, wherein providing the radio manager in each individual moving relay comprises providing a radio resource manager; and providing functionality for exchanging information with radio managers included in moving relays other than the individual moving relay.

In accordance with an embodiment of the presently disclosed subject matter, there is yet further provided a method wherein the at least one mobile station functionality includes at least two mobile station functionalities co-located with the base station functionalities and radio manager; wherein each mobile station functionality from among the at least two mobile station functionalities of the upgraded moving relay communicates via antennae with a unit which has base station functionality thereby to define at least two second radio links, respectively.

In accordance with an embodiment of the presently disclosed subject matter, there is yet further provided a method and also comprising effecting dynamic cell setup without interrupting service to mobile stations served by the base station functionalities by initiating a first hand-over between a first of the two base station functionalities to a second thereof; effecting the dynamic cell setup on the first base station functionality, then initiating a second hand-over between the second of the two base station functionalities to the first thereof and effecting the dynamic cell setup on the second base station functionality.

In accordance with an embodiment of the presently disclosed subject matter, there is yet further provided a method comprising supporting cellular communication over a many-to-one topology.

In accordance with an embodiment of the presently disclosed subject matter, there is yet further provided a method comprising using the two mobile station functionalities to support cellular communication over a many-to-many topology.

In accordance with an embodiment of the presently disclosed subject matter, there is yet further provided a method comprising using the two mobile station functionalities to perform at least one backhauling operation at a data rate which exceeds a data rate of a backhauling operation performed using only one of the two mobile station functionalities.

In accordance with an embodiment of the presently disclosed subject matter, there is yet further provided a method comprising using the two mobile station functionalities to provide a larger number of bearers than would be available if cellular communication were supported by only one of the two mobile station functionalities.

In accordance with an embodiment of the presently disclosed subject matter, there is yet further provided a method comprising using the two mobile station functionalities to provide hot redundancy.

In accordance with an embodiment of the presently disclosed subject matter, there is yet further provided a method wherein the hot redundancy comprises sending data a plurality of times rather than only once.

In accordance with an embodiment of the presently disclosed subject matter, there is yet further provided a method comprising using the two mobile station functionalities to provide a plurality of alternate routes between mobile stations served by the at least one base station functionality, and a core of a cellular network to which the moving relay belongs.

In accordance with an embodiment of the presently disclosed subject matter, there is yet further provided a method comprising using the at least two base station functionalities to provide a bandwidth to a set of mobile base station served by the at least two base station functionalities, that is wider than would be possible if the same set of mobile base stations were to be served by only one of the at least two base station functionalities.

In accordance with an embodiment of the presently disclosed subject matter, there is yet further provided a method wherein the first and second base station functionalities operate at first and second output powers respectively and wherein initiating the first hand-over comprises reducing the first output power of the first base station functionality to a reduced first output power level far enough below the second output power of the second base station functionality, to trigger hand-over from the first base station functionality to the second base station functionality.

In accordance with an embodiment of the presently disclosed subject matter, there is yet further provided a method wherein initiating the second hand-over comprises reducing a current level of the second output power of the second base station functionality to a reduced second output power level far enough below a current level of the first output power of the first base station functionality, to trigger hand-over from the second base station functionality back to the first base station functionality.

In accordance with an embodiment of the presently disclosed subject matter, there is yet further provided a method comprising providing a first set-up, suited to a first subset of a population of mobile stations served by the at least two base station functionalities, for a first base station functionality of the at least two base station functionalities; providing a second set-up, which is suited to mobile stations not belonging to the first subset and which differs from the first set-up, for a second base station functionality of the at least two base station functionalities; using the first base station functionality to serve mobile stations in the first subset; and using the second base station functionality to serve mobile stations in the second subset.

In accordance with an embodiment of the presently disclosed subject matter, there is yet further provided a method wherein the first subset comprises mobile stations requiring a particularly low latency.

In accordance with an embodiment of the presently disclosed subject matter, there is yet further provided a method wherein the dynamic cell setup comprises providing a new value to a main set-up frequency parameter.

In accordance with an embodiment of the presently disclosed subject matter, there is yet further provided a method wherein the dynamic cell setup comprises providing a new value to a cell bandwidth parameter.

In accordance with an embodiment of the presently disclosed subject matter, there is yet further provided a method wherein the dynamic cell setup comprises providing a new value to a frame timing parameter.

In accordance with an embodiment of the presently disclosed subject matter, there is yet further provided a method wherein the dynamic cell setup comprises providing a new value to a master information block (MIB) parameter.

In accordance with an embodiment of the presently disclosed subject matter, there is yet further provided a computer program product, comprising a non-transitory computer usable medium having a computer readable program code embodied therein, the computer readable program code adapted to be executed to implement any of the methods shown and described herein.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking" ', "grading", "calculating", "determining", "generating", "reassessing", "classifying" ', "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Figure 1A:
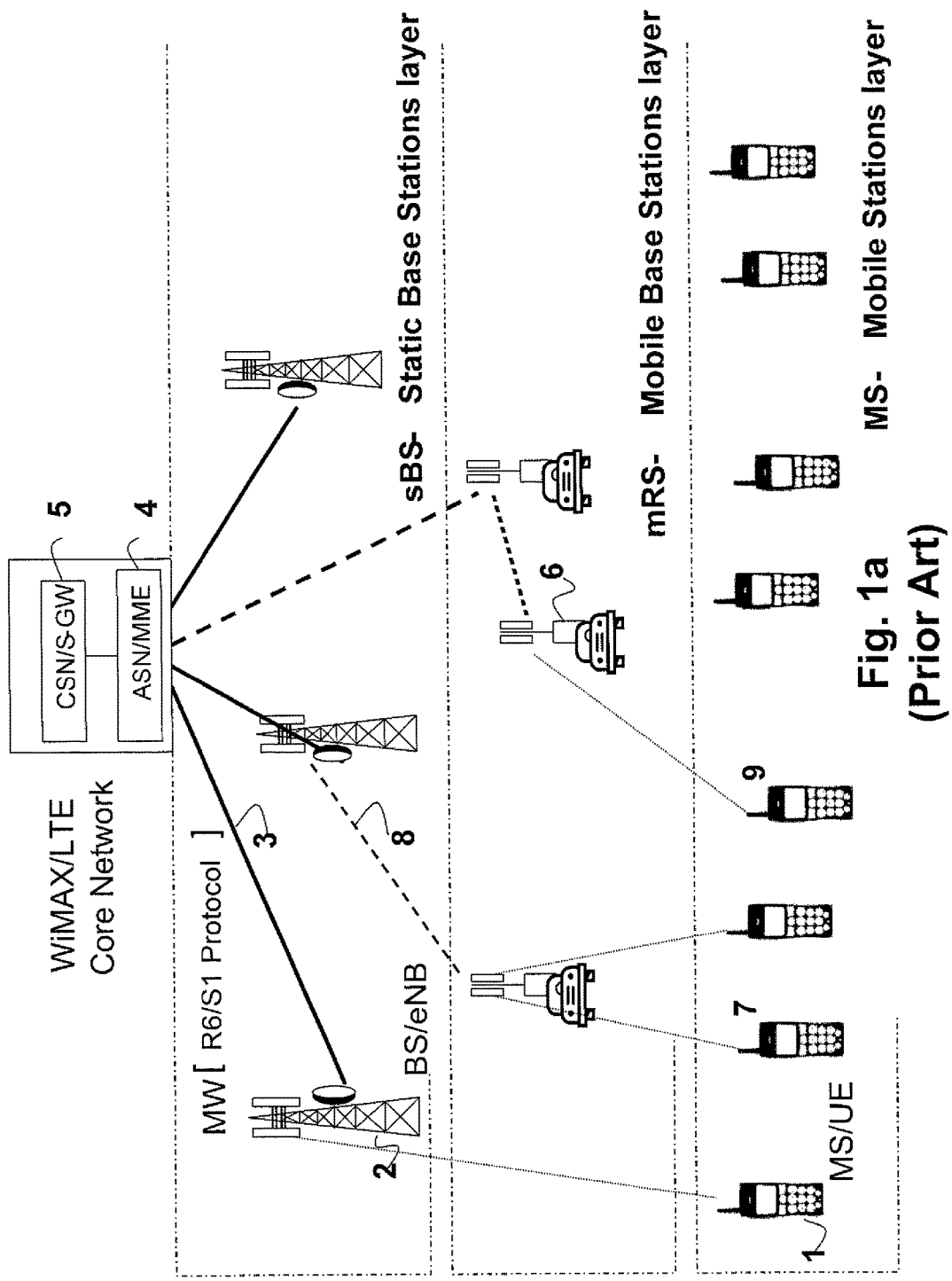
FIG. 1a illustrates a prior art multi-layer cellular network comprising a core network regular radio access network and a relayed radio access network.
Figure 1B:
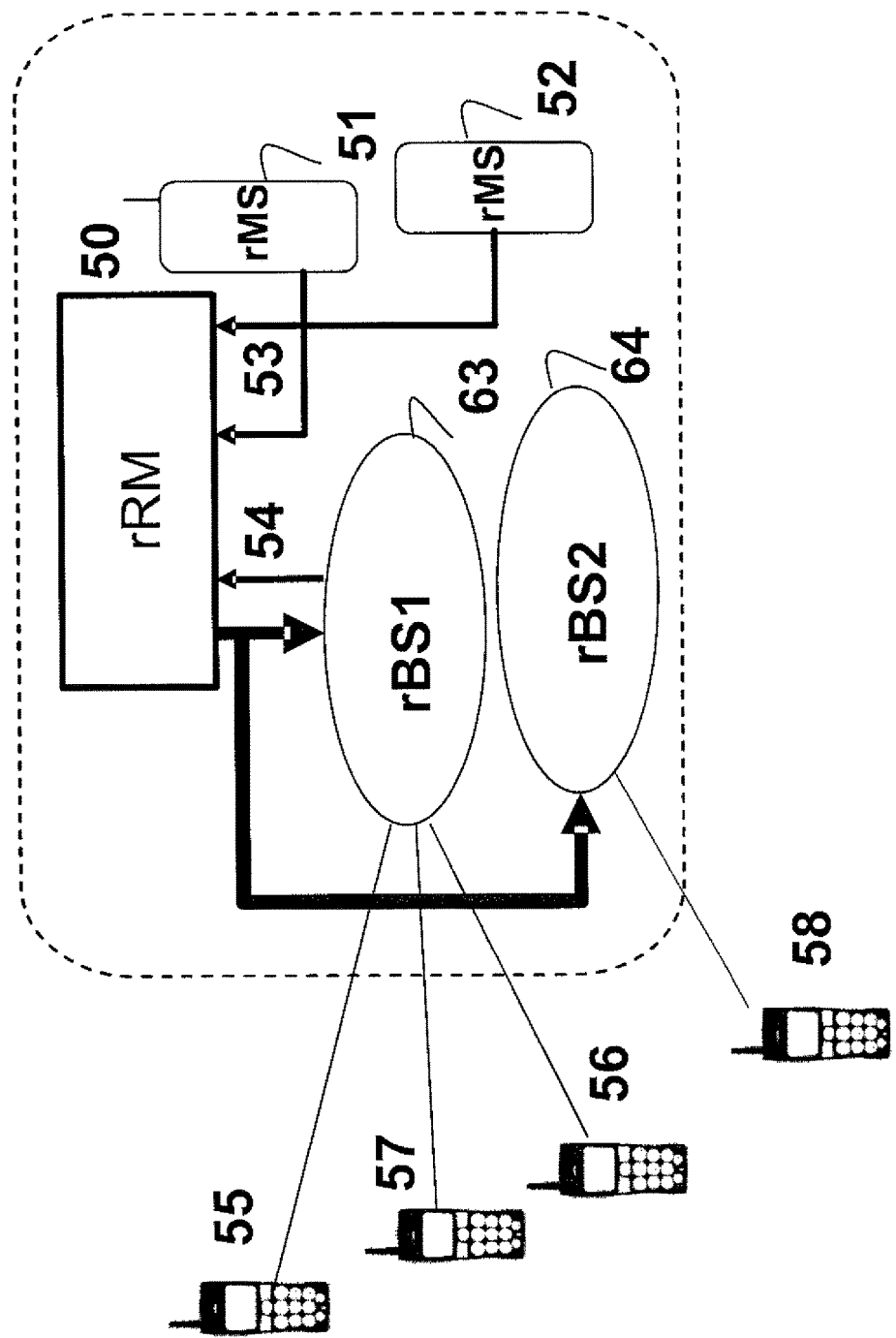
FIG. 1b is a semi-pictorial semi-block diagram illustration of an upgraded moving relay with multiple (two, in the illustrated embodiment) mobile station functionalities and multiple (two, in the illustrated embodiment) base station functionalities, where the term "upgraded moving relay" is used herein to refer to a moving relay having more than one base station functionality and/or more than one moving station functionality.
Figure 2:
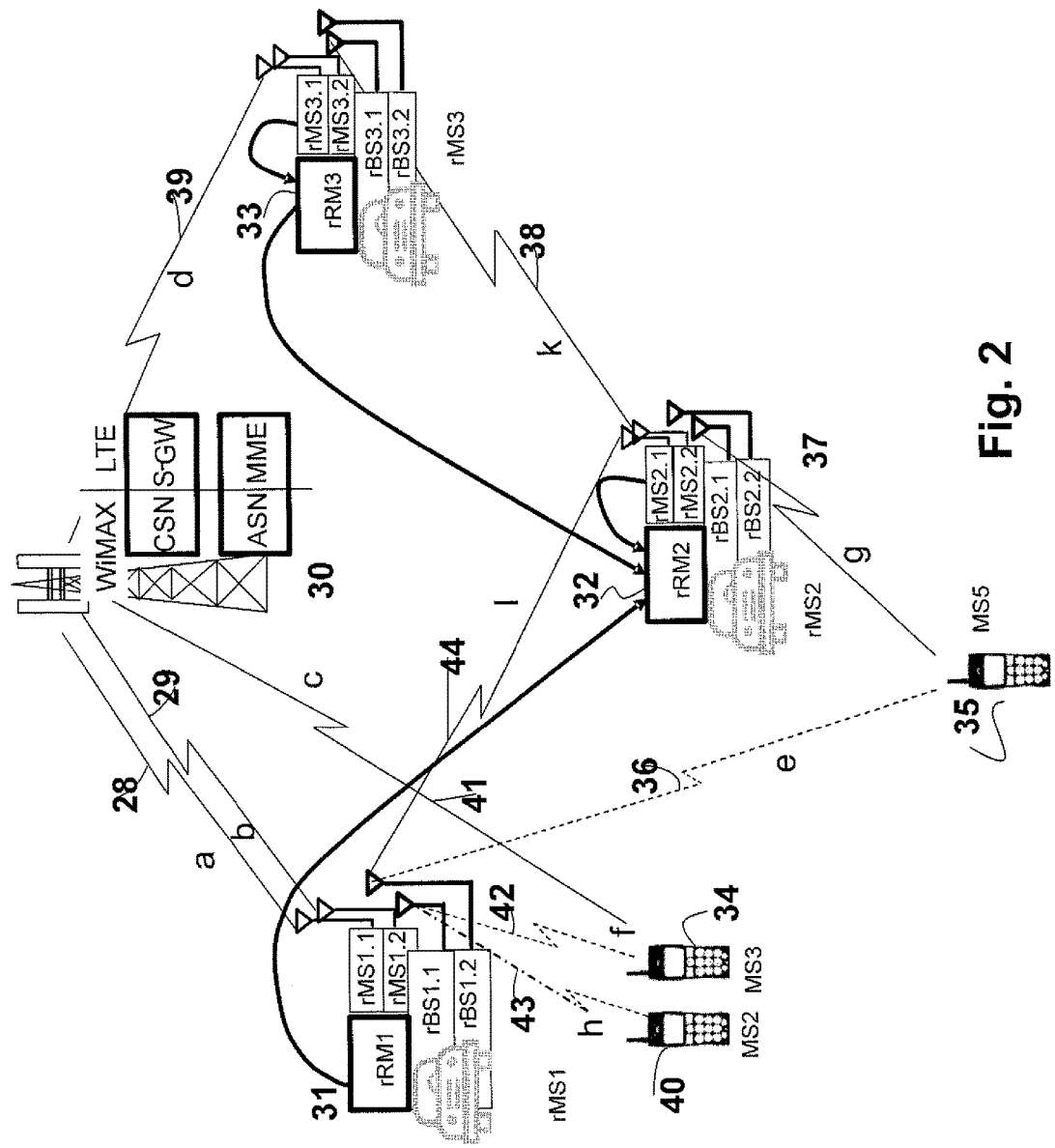
FIG. 2 is a general architecture of network using several upgraded moving relays, all according to an embodiment of the present invention.
Figure 3:
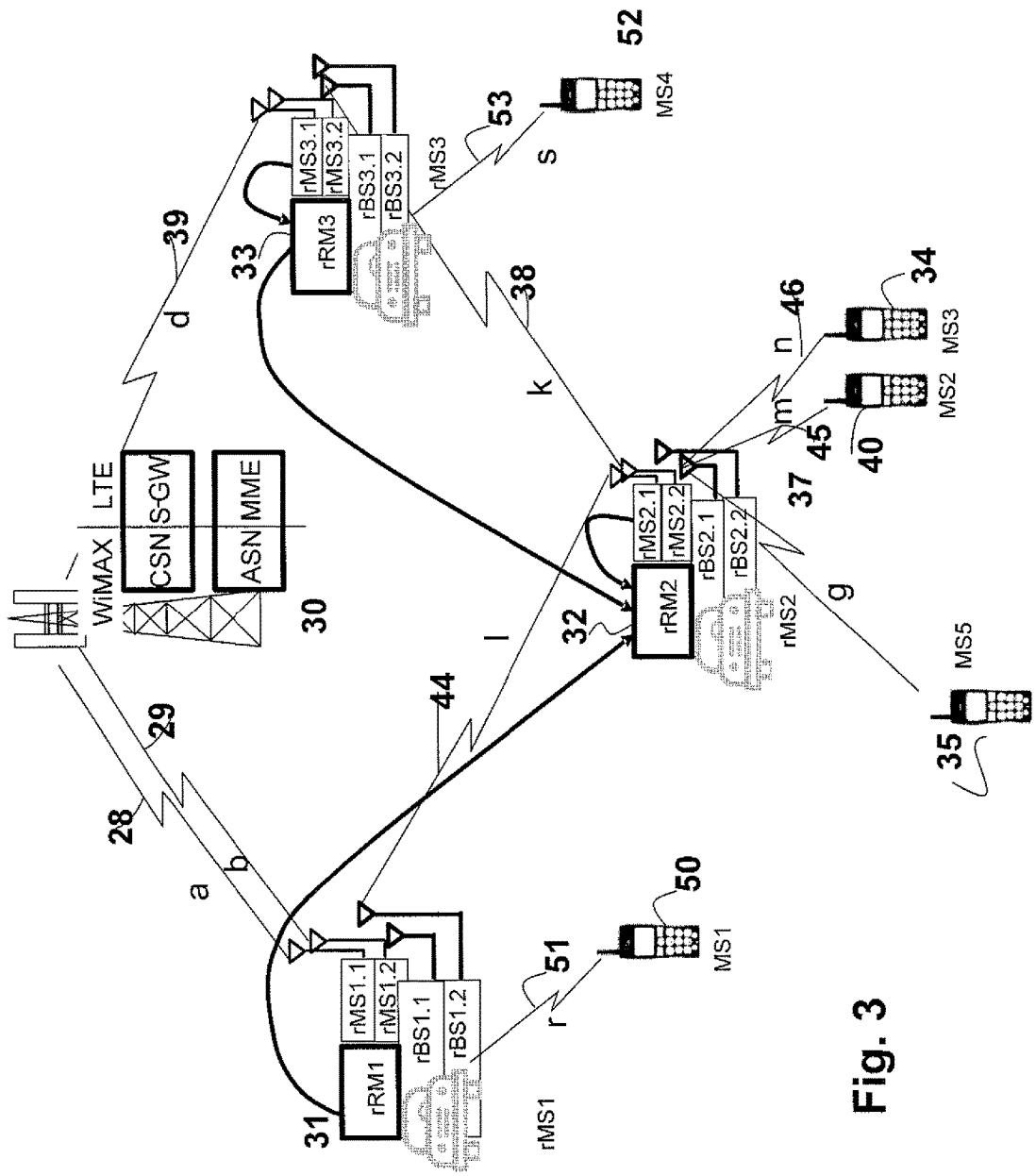
FIG. 3 depicts use of multiple mobile station functionalities in an upgraded moving relay in order to increase bandwidth and/or to increase the number of available bearers or as an alternate "hot" route, all according to an embodiment of the present invention.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Architecture and methods operative to facilitate transfer of control and traffic information between each one of the mobile stations, through any hierarchical cellular topology to any destination e.g. a mobile station in the same network or any destination outside the network, are now described with reference to FIGS. 1a-8. A solution for the 4G 3GPP cellular network, also known as LTE (Long Term Evolution) is presented herein, but the same principles, mutatis mutandis, may be applied to any hierarchical cellular network.

In an existing LTE cellular network each mobile station is typically identified by its own IP. A packet that is addressed to a mobile station is being routed through an IP connectivity gateway termed P\S-GW using a GTP tunnel to the base station and from there to the mobile station e.g. cellular telephone.

In hierarchical cellular networks e.g. an IP based cellular system utilizing extended tunnels such as TS 36.806, the packet is routed through several tunnels and is routed to the addressed mobile station.

Hierarchical cellular networks e.g. TS 36.806 typically suffer from backhauling bottleneck issues; certain embodiments seek to reduce these. For example:

Moving relays may be limited by the number of bearers they are able to create. The number of bearers that a moving relay is able to provide is limited by the number of bearers that a mobile station functionality is able to create. The number of bearers that a mobile station functionality is able to create may be increased by using several mobile station functionality devices in the moving relay.

Different mobile stations that are connected to the same moving relay may be served by different mobile station functionalities. The moving relay may give different priorities to different mobile stations by using different bearers with different prioritizations that are allocated to the same mobile station functionality. For example, in FIG. 3, the maximal bearer count available for each mobile station is 5. Mobile Station 5, Mobile Station 3, and Mobile Station 2 each use 2 bearers. In this example it may be impossible to send all 6 bearers through a single mobile station functionality (mobile station functionality rMS 2.1). In order to relay all 6 user bearers, it is possible to use an additional mobile station functionality (mobile station functionality rMS 2.2) which adds 5 additional bearers, which enables relaying all 6 user bearers. In the example, mobile station functionality rMS 2.1 relays 2 bearers of Mobile Station 5, using base station functionality rBS 1.2 as a base station functionality and mobile station functionality rMS 1.2 as a mobile station functionality. Mobile station functionality rMS 2.2 relays the remaining 4 bearers using base station functionality rBS 3.1 and mobile station functionality rMS 3.1.

Figure 6:
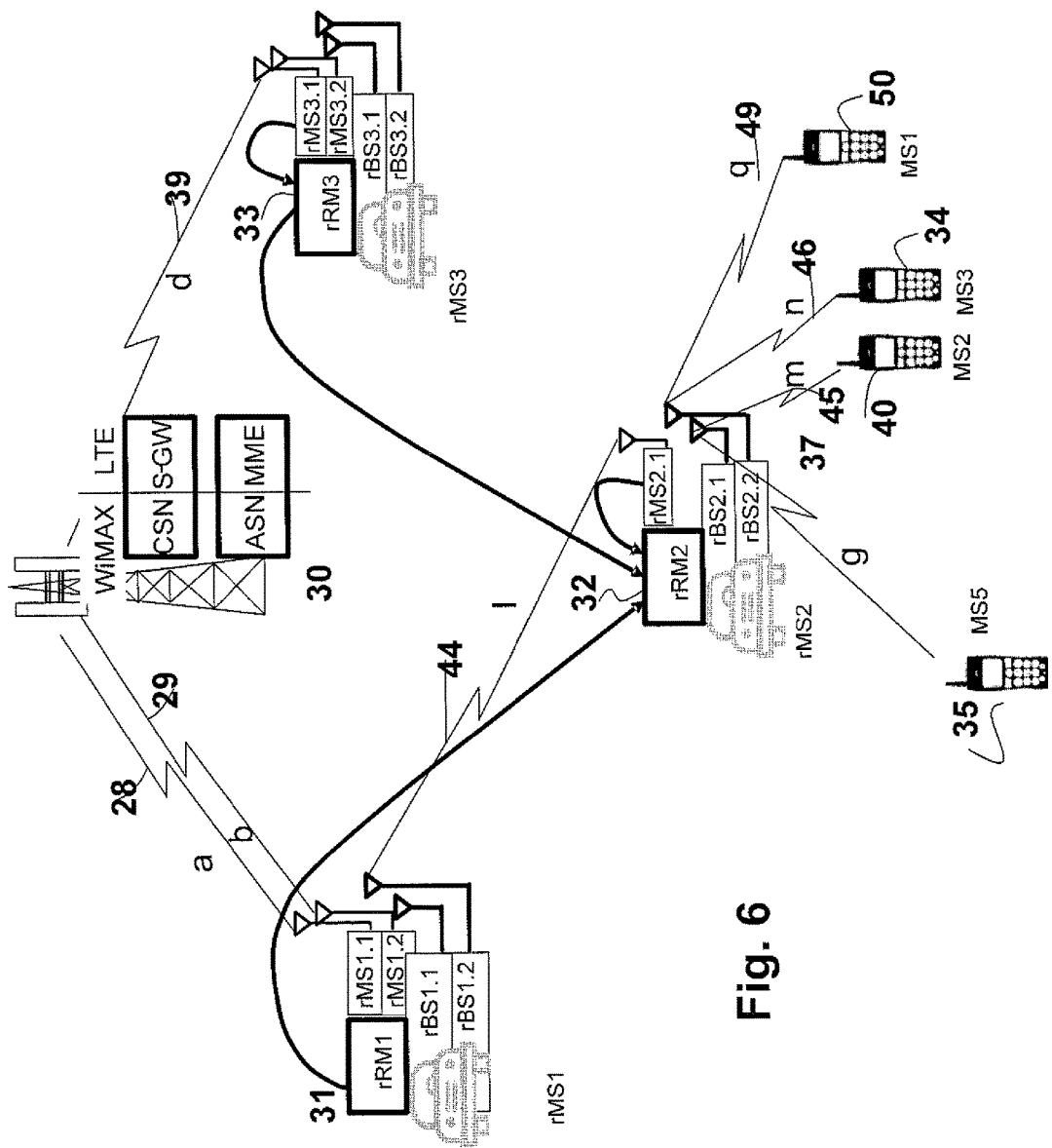
FIG. 6 depicts the limitation of maximal bandwidth by the minimal available bandwidth of a radio link along the path to the core, all according to an embodiment of the present invention.

The maximal bandwidth is typically limited by the minimal available bandwidth of a radio link along the path to core. For example, FIG. 6 shows that the maximal total available bandwidth to the mobile stations that is linked to mobile station functionality rMS 2 is limited by the lowest radio link available bandwidth, e.g. the minimum of the bandwidth of radio link "a" or "l". The moving relay may use an additional mobile station functionality in order to enlarge the over-all bandwidth by connecting each mobile station functionality to a different base station functionality and using different paths of linked relay to the core. For example, in FIG. 3, the maximal bandwidth available for mobile station functionality is 5 MHz. The maximal available bandwidth for the stationary base station (30) is 20 MHz. Using a single mobile station functionality (also termed herein "rMobile-station") and a single base station functionality (also termed herein "base station functionality rBS") the available throughput of mobile station functionality rMS 1 and mobile station functionality rMS 3 is 5 MHz due to the limitation of 5 MHz of the mobile station functionality.

Mobile station functionality rMS 2 is distant from the stationary base station and is relayed by either mobile station functionality rMS 3 or mobile station functionality rMS 1. Using a single base station functionality and a single mobile station functionality mobile station functionality rMS 2 shares bandwidth resources with either Mobile Station 4 or Mobile Station 1 and its available throughput is less than 5 MHz. But using an additional mobile station functionality in mobile station functionality rMS 2 (e.g. both mobile station functionality rMS 2.1 and mobile station functionality rMS 2.2) enables sharing the available bandwidth of both mobile station functionality rMS 1 and mobile station functionality rMS 3 e.g. by connecting mobile station functionality rMS 2.1 to mobile station functionality rMS 1, and mobile station functionality rMS 2.2 to mobile station functionality rMS 3.

Figure 5:
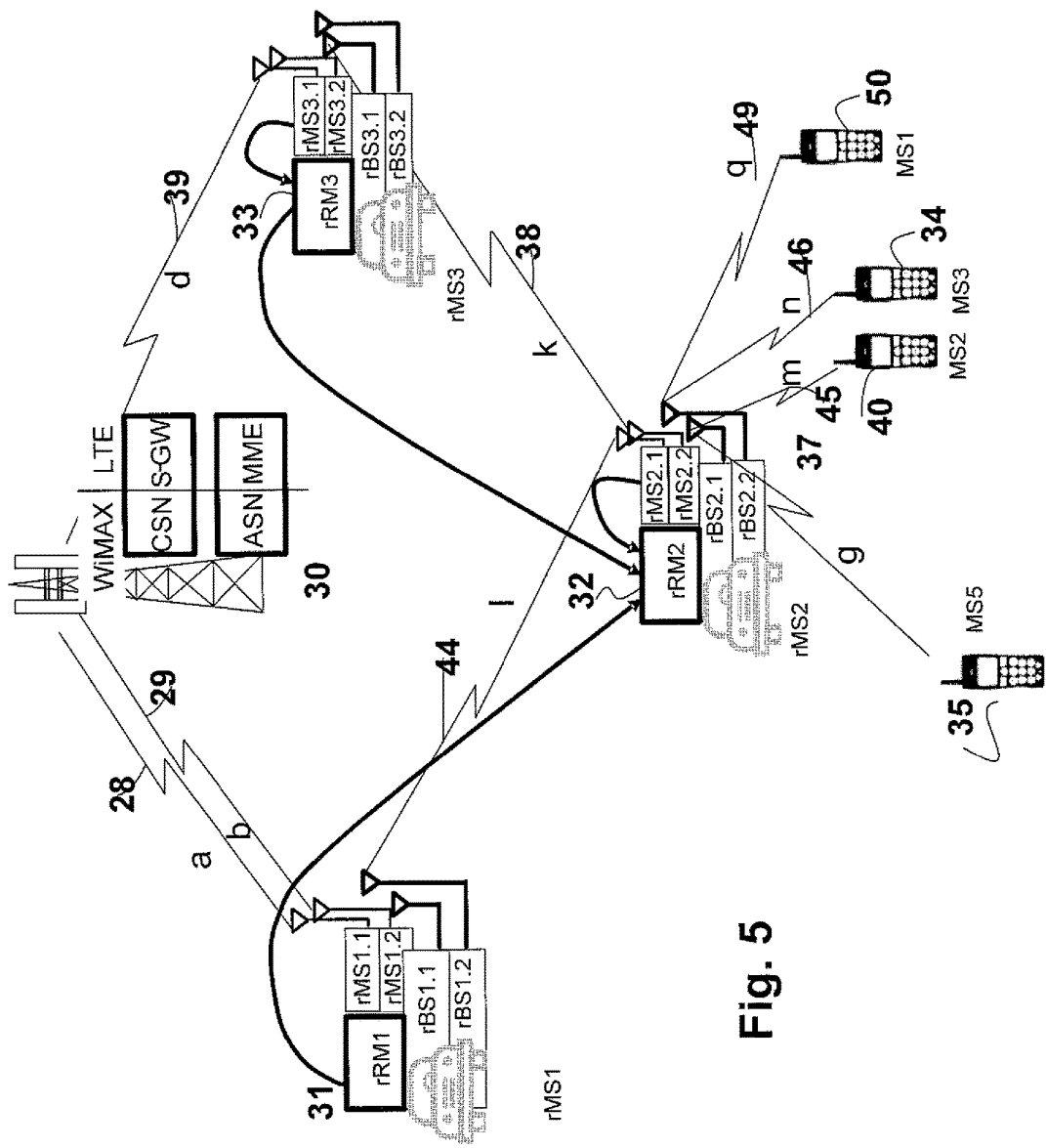
FIG. 5 depicts the usage of a secondary base station functionality in order to enlarge total throughput of the relay mobile node (moving relay), all according to an embodiment of the present invention.

If, for example Mobile Station 1 is using 2 MHz and Mobile Station 4 is using 2 MHz, this enables a backhauling capacity of 6 MHz and total throughput of 5 Mhz due to the limitation of 5 MHz per mobile station functionality. But adding another base station functionality in the moving relay enables serving the users with bandwidth of 10 Mhz, e.g. by serving some of the mobile stations using the first base station functionality and the remaining mobile stations with the other base station functionality. For example, as depicted in FIG. 5, Mobile Station 2 and Mobile Station 5 are served by base station functionality rBS 2.1. Mobile Station 3 and Mobile Station 1 are served by base station functionality rBS 2.2. Connecting mobile station functionality rMS 2.1 to base station functionality rBS 1.2 and mobile station functionality rMS 2.2 to base station functionality rBS 3.2 yields a total 10 MHz bandwidth in the mobile station functionality rMS 2.

Additionally tunnels in a hierarchical dynamic cellular system may suffer from high packet loss rate. This may be due to the dynamic nature of the system and/or the high probability of a lost connection. The probability of a packet being lost may be decreased by using several mobile station functionalities using different radio links to the core each, optionally subsequently, sending identical data. A server that receives the duplicated packets may be operative to ignore the duplicated packets. Alternatively the duplicated packets may be filtered by a dedicated server. Alternatively the duplicated packets may be filtered by the p-gw. For example as depicted in. FIG. 5, Mobile Station 5, Mobile Station 1, Mobile Station 3 and Mobile Station 2 use mobile station functionality rMS 2 to communicate with the core. In order to decrease the chance of a packet being lost, relay resource manager rRM2 sends the same data (a) through mobile station functionality rMS 2.1 using radio link "1" to mobile station functionality rMS 1 and (b) through mobile station functionality rMS 2.2 using radio link "k" to mobile station functionality rMS 3. from there mobile station functionality rMS 3 communication data is sent to the core using link "d" and from mobile station functionality rMS 1 communication data is sent through radio links "a" and "b".

In many conventional systems, the handover mechanism in the LTE cellular network works as follows: a base station functionality (eNB in LTE) collects link measurements of the mobile station (UE in LTE), and collects the link quality of neighboring base station functionality (neighboring eNB) as sensed by the mobile station (UE). When the base station (eNB) senses that the link quality has fallen below a threshold and one of the neighboring links' quality is better, the base station initiates a hand-over request.

Figure 4:
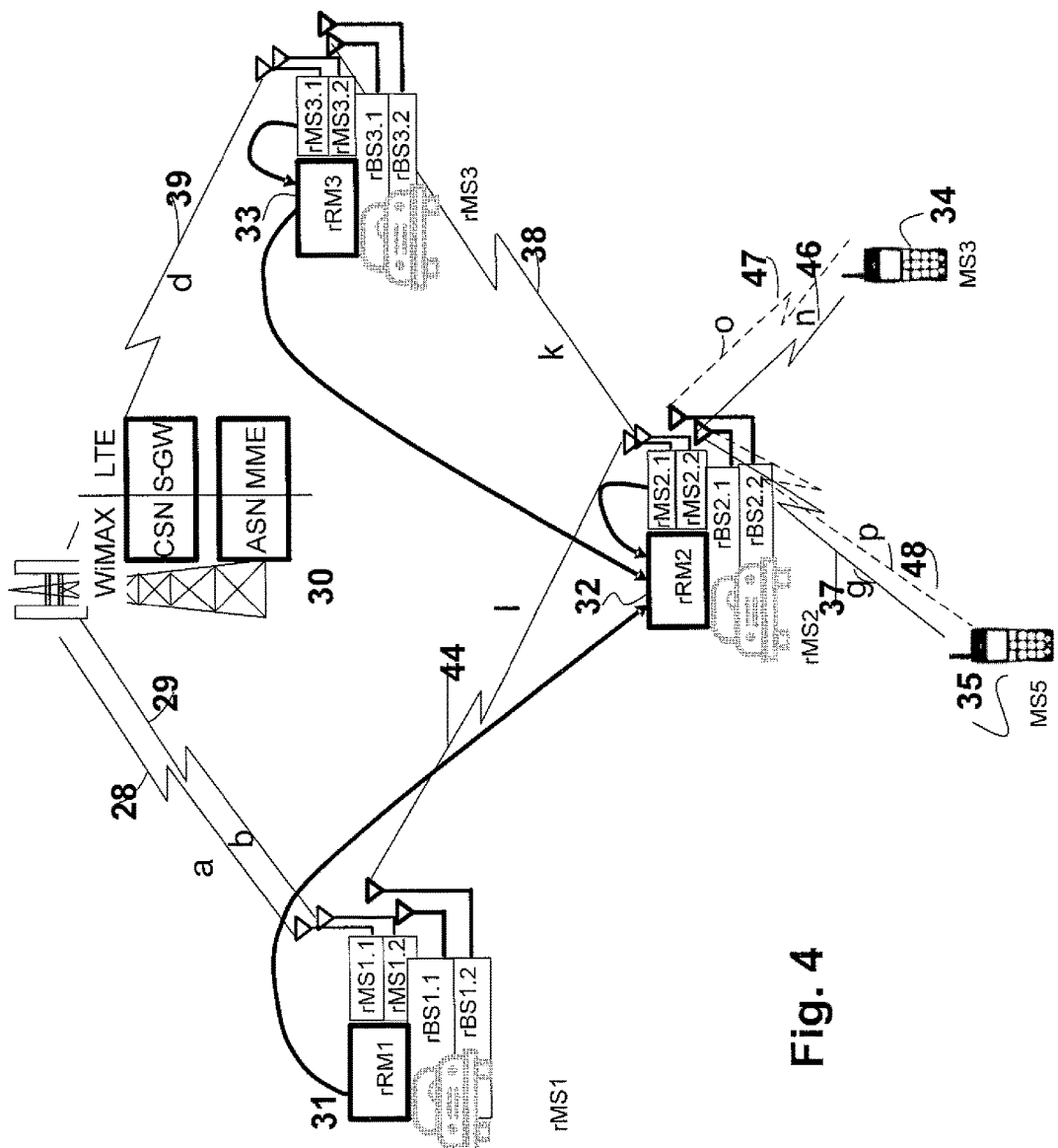
FIG. 4 depicts usage of a secondary or additional base station functionality in order to effect "hot" configuration change in the Base Station functionality using a handover mechanism between a first and second e.g. primary and secondary relay Base Station, all according to an embodiment of the present invention.
Figure 7:
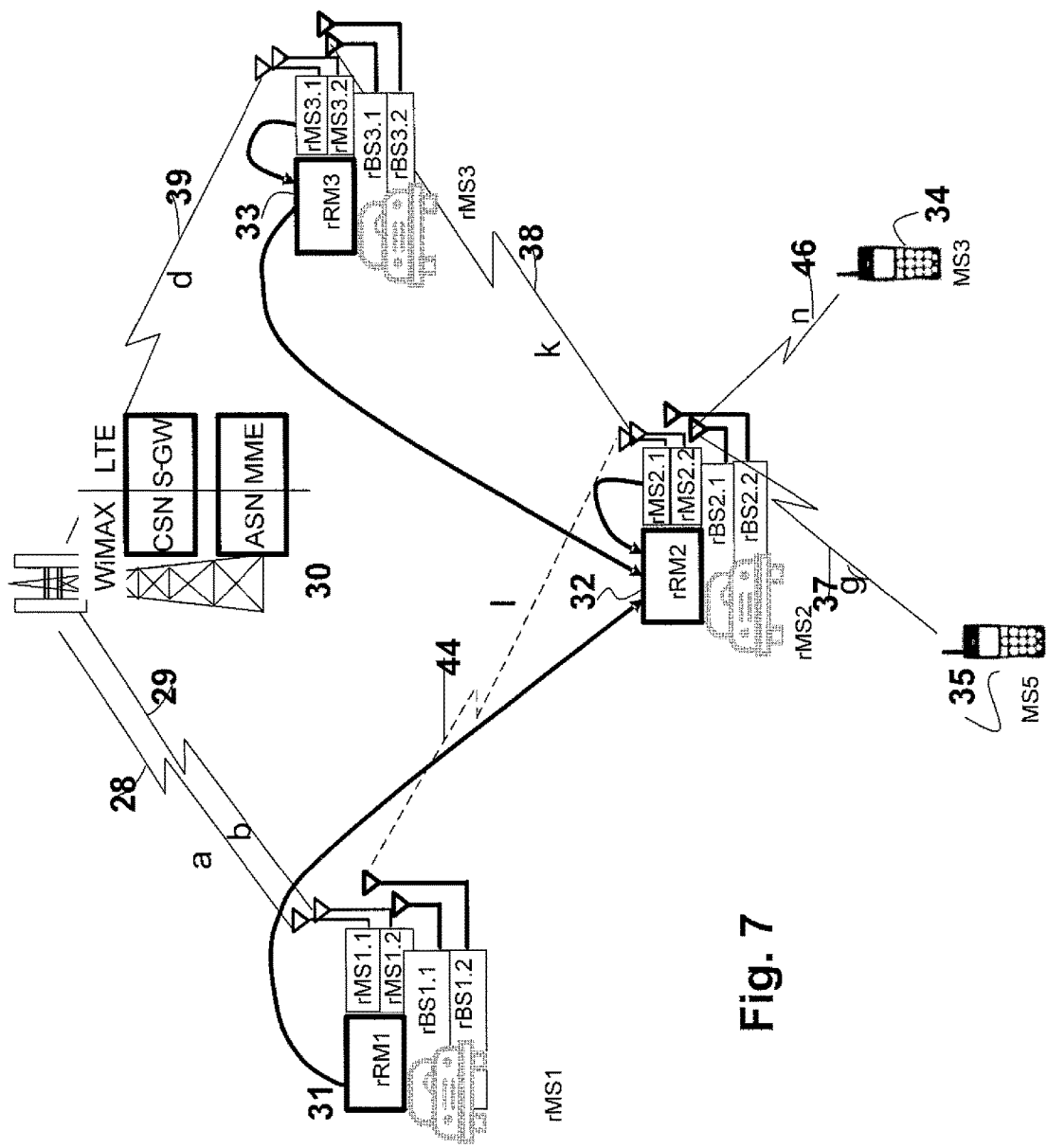
FIG. 7 depicts the usage of an upgraded relay node in order to generate an alternative radio link path to the core by switching to an additional e.g. secondary mobile station functionality, all according to an embodiment of the present invention.

The request goes directly to the neighboring base station or through the core using the mobility management entity at the LTE core. When the neighbor base station acknowledges the hand-over request, the base station sends a hand-over command to the mobile station. An alternative path to the core may be generated using moving relay nodes and utilizing a suitable hand-over mechanism. An alternating method for switching to an alternative route may employ an upgraded relay node by switching communication from a mobile station functionality to a backup mobile station functionality. The backup mobile station may use an alternate radio link route. For example as depicted in FIG. 7, mobile station functionality rMS 2 uses radio link "k" in order to communicate with the core and radio link "l" as a backup radio link in order to give service to Mobile Station 3 and Mobile Station 5. Upon a triggered event, for example a detected radio link quality decline in radio link "k", mobile station functionality rMS 2 may switch communication and use "l" as a backhauling radio link. In an upgraded moving relay as shown and described herein, a handover mechanism may be used in order to "transparently" (to mobile stations served by the moving relay) temporarily shut down one of the base station functionalities which resides in the moving relay. For example, as depicted in FIG. 4, Mobile Station 5 and Mobile Station 3 are linked to base station functionality rBS 2.1. At some time relay resource manager rRM2 desires to temporarily shut down base station functionality rBS 2.1 e.g. for maintenance. Relay resource manager rRM2 commands base station functionality rBS 2.1 to lower its transmission power and increase its minimum received threshold. On the other hand, relay resource manager rRM2 may command base station functionality rBS 2.2 to decrease its minimum received threshold, say to the minimum received threshold that was used by base station functionality rBS 2.1 and to increase base station functionality rBS 2.2's transmission power, say to the transmission power that was used by base station functionality rBS 2.1. These changes may trigger a normal handover mechanism, resulting in a handover from base station functionality rBS 2.1 to base station functionality rBS 2.2 of Mobile Station 5 and Mobile Station 3.

Figure 8:
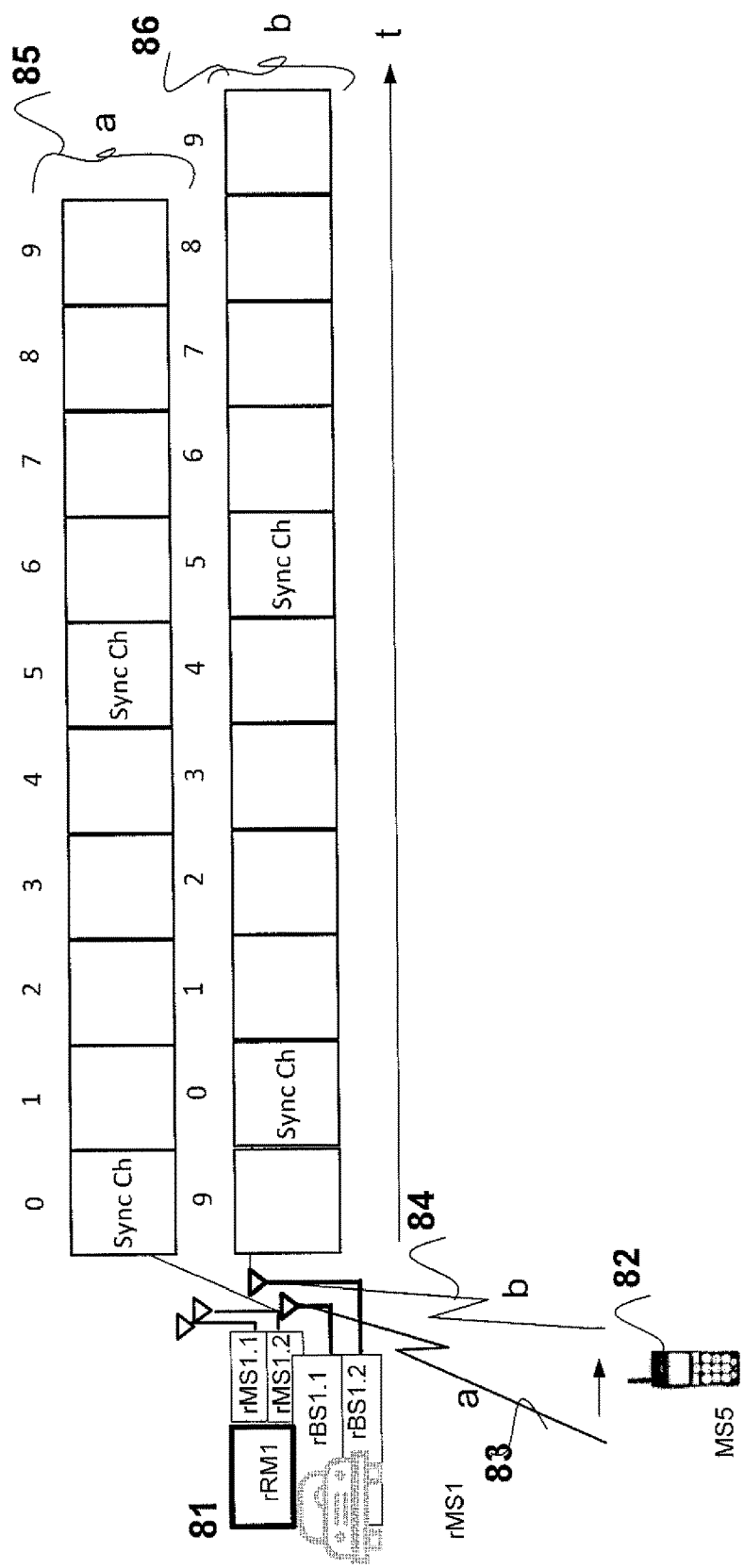
FIG. 8 illustrates an example dynamic cell-setup procedure using, by way of example, two relay base stations (rBSs), all according to an embodiment of the present invention.

FIG. 8 is an example of a dynamic cell-setup procedure using multiple e.g. two relay base stations (base station functionalities rBSs). The relay has, in the illustrated example, two relay base stations, rBS1.1 and rBS 1.2. The mobile stations connected to the relay use rBS1.1. In this example, the relay uses the secondary [rBS1.2] base station in order to change cell parameters and/or timing parameters.

Mobile station MS5 is connected to the core using mobile station functionality rMS1.1 (for backhauling link) through its serving relay base station rBS1.1. In the event that relay resource manager rRM1 wants to change its corresponding rBS's (base station functionality) parameters (e.g. one or more of: frame timing parameters, cell center frequency, cell bandwidth, PLMN identity, MIMO configuration, or any other static cell parameter), relay resource manager rRM1 may set the secondary base station functionality rBS1.2 to the desired cell configuration (setup of its parameters) and handover all the mobile stations that are connected to base station functionality rBS1.1 to base station functionality rBS1.2, e.g. by lowering the transmission power of base station functionality rBS1.1 and increasing the transmission power of base station functionality rBS1.2 in order for the mobile stations to be able to receive the reference signal of both base stations and be able to handover to the second base station (rBS1.2). In the example mobile station MS5 is connected to base station functionality rBS1.1 using link "a". The relay resource manager rRM1 may change its relay rBS (base station functionality) timing parameters, shifting the base station functionality's time frame e.g. by one TTI (1 millisecond) or several, such as 2-9 TTIs or less than a single TTI (e.g. a fraction of 1 millisecond) and in addition change the base station functionality's cell bandwidth for example from 10 MHz to 20 MHz (or to any bandwidth within the standard definitions such as, but not limited to: 1.4 MHz, 3 MHz, 5 MHz). This may be effected, e.g., by (optionally powering on) and setting up base station functionality rBS1.2 to the desired configuration and performing handover of mobile station MS5 to base station functionality rBS1.2 using link "b". Afterwards relay resource manager rRM1 may optionally, e.g. depending on predetermined turning-off criteria, turn off rBS1.1 in order to save power and decrease interference to base station functionality rBS1.2 or to any other nearby base station.

Figure 9A:
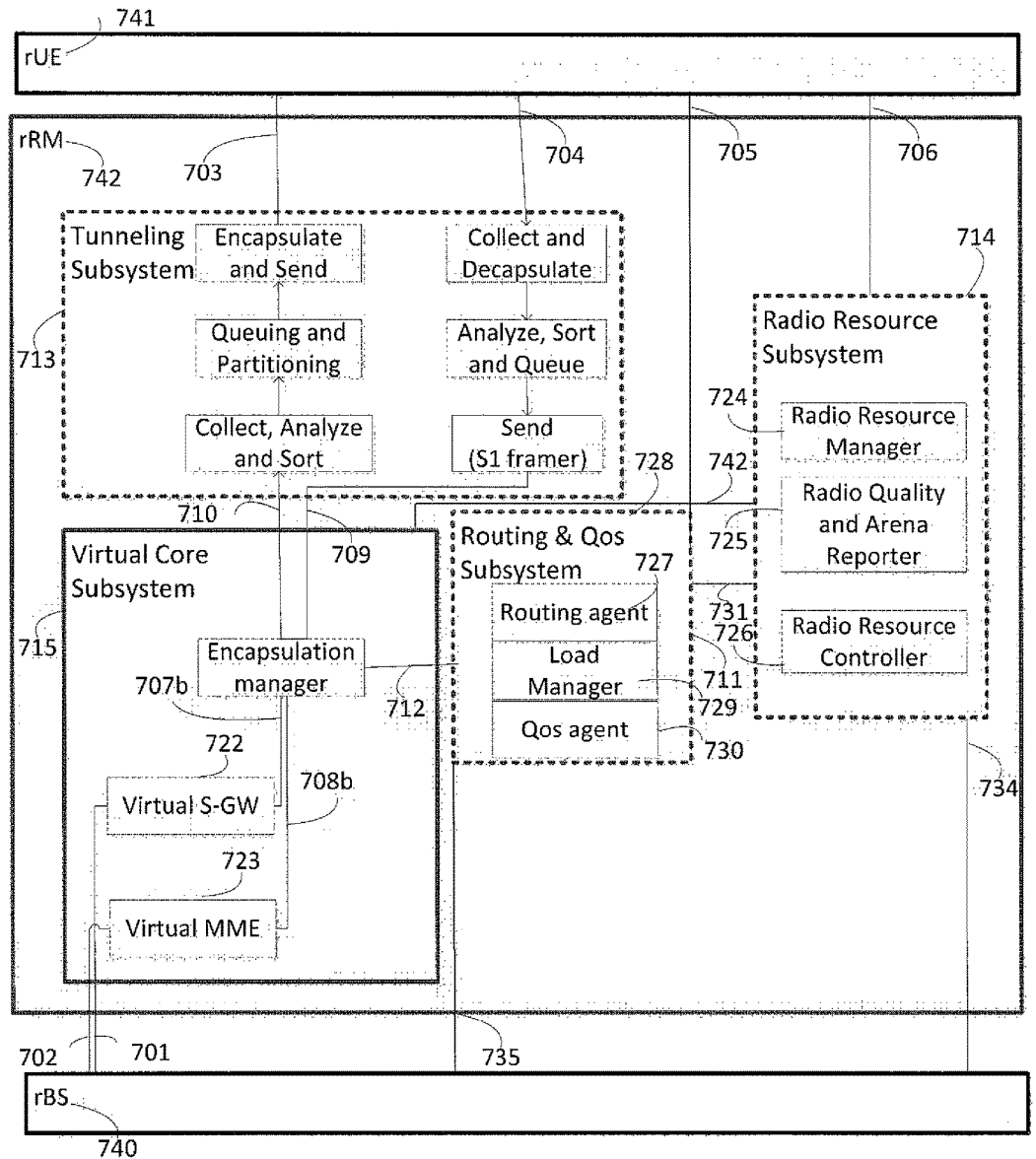
FIG. 9a is a simplified block diagram of a relay resource manager (rRM) of a relay according to an embodiment of the present invention.

FIG. 9a describes detailed block diagram of relay resource manager (rRM) of relay. As shown, the relay resource manager comprises some or all of: a Tunneling subsystem [713], Radio Resource subsystem [714] Virtual core subsystem [715] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack.

The Virtual core subsystem typically constitutes the gateway between the core (stationary) on the one hand, and various resource management subsystems and the base station functionality rBS [740] on the other hand. The Virtual core subsystem may communicate with the base station functionality rBS [740] or core (of the static network) e.g. using standard S1-MME [702,708b,709,710] and S1-U [701,707b,709,710] or proprietary management and control (M&C) over IP interface [701,707b,709,710] with the base station functionality rBS [740] and remote core. The Virtual core subsystem may send all or any of the S1-MME M&C messages to the core optionally through the Tunneling Subsystem [713].

The Encapsulation manager function of the Virtual core subsystem [715] implements a Network event listener e.g. as illustrated in FIG. 6 at reference numeral 1304 and a Network event handler e.g. as illustrated in FIG. 6 at reference numeral 1305]. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received [712] by the Routing and QoS Subsystem to/from the core being used, for example messages to create or delete a bearer.

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740] accordingly. If a remote core is used by the relay, the Virtual S-GW [722] and Virtual MME [723] may emulate these core functions as proxies so that the base station functionality rBS [740] works smoothly and seamlessly despite remoteness of the core.

The Routing & QoS subsystem [728] may comprise some or all of a routing agent [727], Load manager [729] and QoS Agent [730]. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740] such as PLMN, and/or may command the base station functionality rBS [740] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730] or Encapsulation manager (block of the Virtual Core Subsystem [715]) or mobile station functionality [741] or base station functionality rBS [740] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730] is operative for creating bearers according to the current attached mobile stations and their bandwidth requests in case there is a need for a additional bearer due to the multi-hop mechanism.

The Radio Resource Subsystem [714] may comprise some or all of: Radio resource manager [724], Radio Quality and Arena Reporter [725] and Radio Resource Controller [726]. The radio resource subsystem [714] is operative for reducing interference between: (1) relay's access links which may be sent and received by the base station functionality rBS [740]) and relay's backhauling links which may be sent and received by the rUE (rMS) [740]; (2) relay's access links and other relays' access links; and (3) relay backhauling links and other relays' backhauling links. The Radio resource controller [726] is operative for controlling different radio resources of the mobile station functionality rUE [741] and of base station functionality rBS [740] e.g some or all of: lower base station functionality transmission power, blanking particular base station functionality resource blocks/subframe/s, request for mobile station functionality uplink grant, changing center frequency, changing bandwidth.

The Radio Quality and Arena Reporter [725] may be operative for gathering a radio measurement report indicating received power reports of the base station functionality rBS [740] and base station functionality rBS's neighboring base stations from the connected mobile stations reporting to the base station functionality rBS [740] and from the mobile station functionality rUE [741]. The radio measurement report may indicate one or more of: the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740]. The Radio resource manager can further optionally communicate with other relays' radio resource subsystems through interface [742] e.g. using the virtual core subsystem [715] Encapsulation manager.

Tunneling Subsystem [713], Routing & QoS Subsystem [728] and Rario Resource Subsystem [714] are optional subsystems of the relay resource manager rRM. All or any subset of these subsystems can be added to the relay resource manager rRM by need.

Figure 9B:
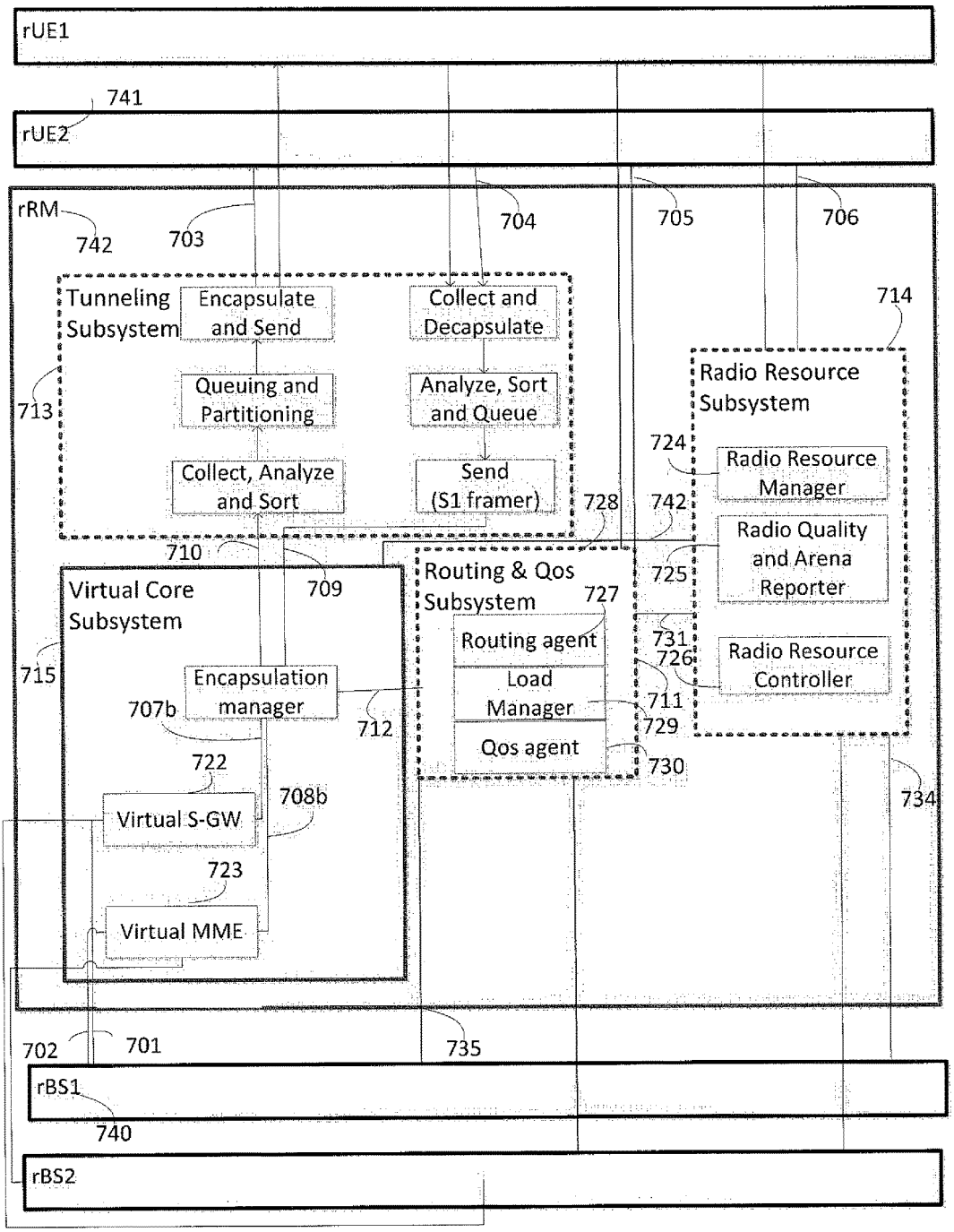
FIG. 9b is a simplified block diagram of a relay resource manager (rRM) [742] of an upgraded (multi-element) moving relay according to an embodiment of the present invention.

FIG. 9b is a simplified block diagram of a relay resource manager (rRM) [742] of an upgraded (multi-element) moving relay according to an embodiment of the present invention. The illustrated configuration of two rMSs and two rBSs can be degraded to having, in the upgraded relay, only two rBSs and single rMS or only two rMSs and single rBS.

Figure 10:
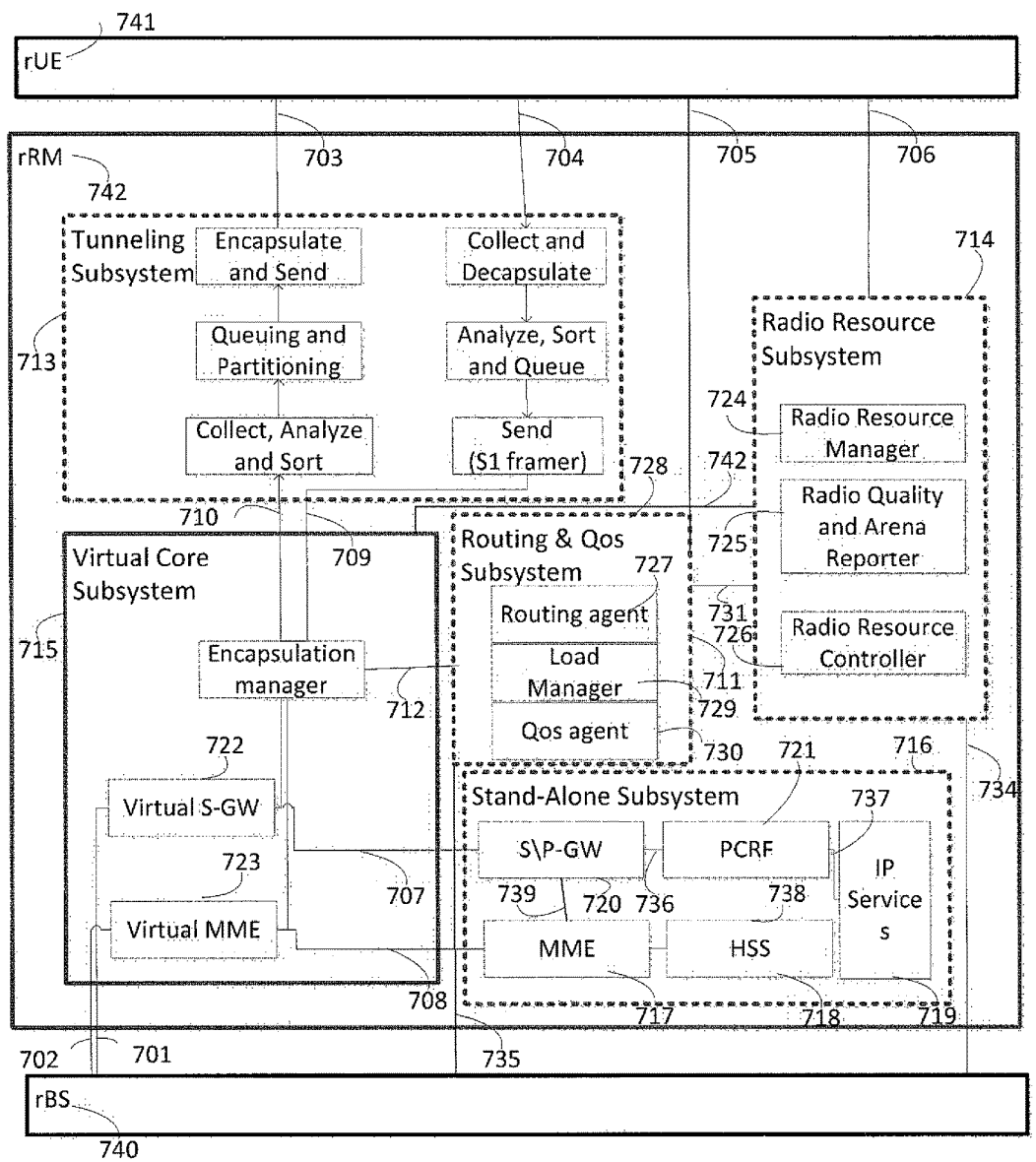
FIG. 10 is a simplified block diagram of a relay resource manager (rRM) of a relay that includes Stand-alone subsystem, according to an embodiment of the present invention. This subsystem can be added to the upgraded moving relay in order to enable it to operate in an emergency mode.

FIG. 10 is a simplified block diagram of a relay resource manager (rRM) of a relay that includes a Stand-alone subsystem, according to an embodiment of the present invention. This subsystem can be added to the upgraded moving relay in order to enable the upgraded moving relay to operate in an emergency mode.

Figure 11:
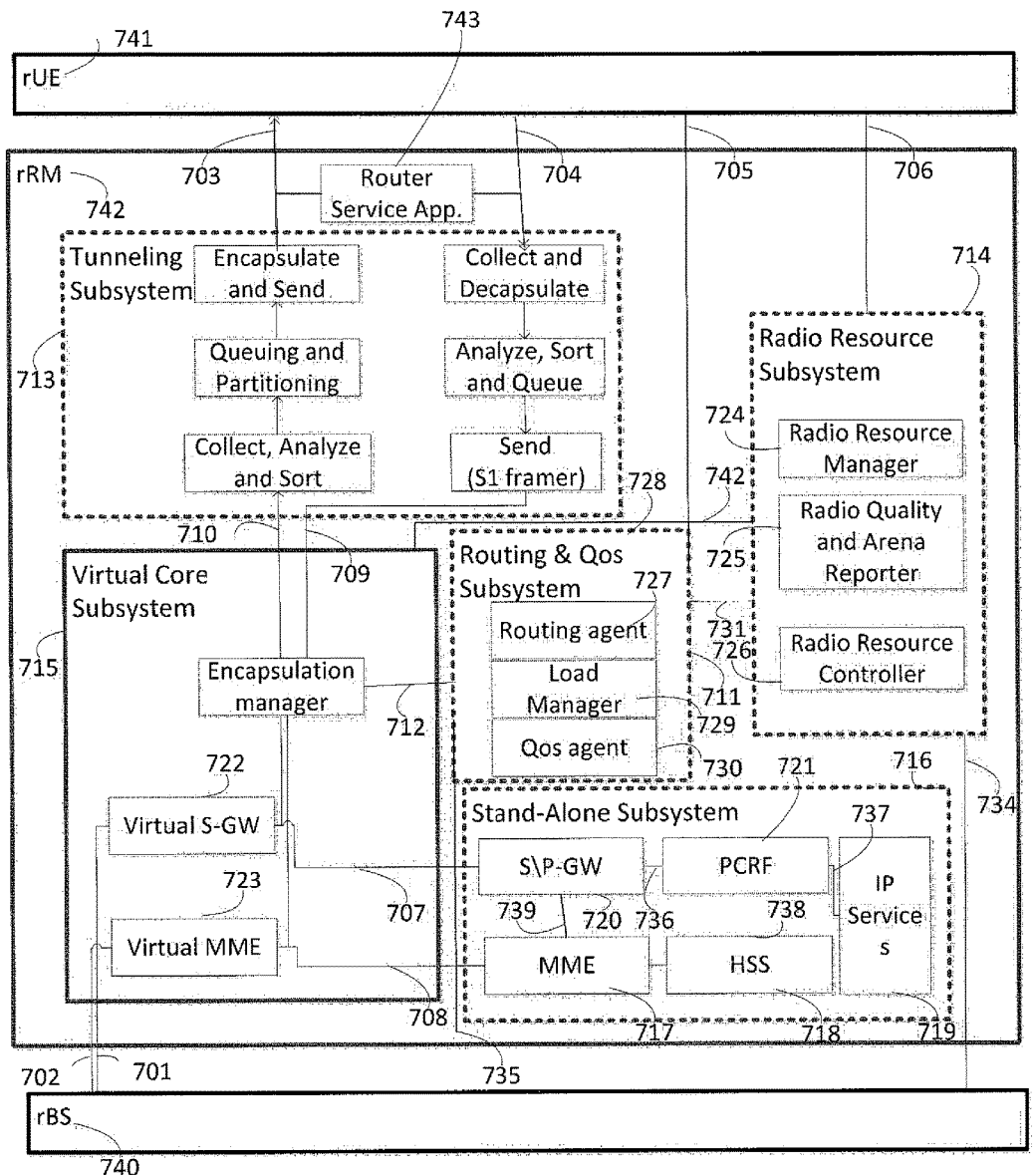
FIG. 11 is a simplified block diagram of a relay resource manager (rRM) of a relay having an internal router service application for multi-hop encapsulation. This router service application can be added to the upgraded relay to enable it to do extended tunnels for multi-hop encapsulation.

FIG. 11 is a simplified block diagram of a relay resource manager (rRM) of a relay having an internal router service application for multi-hop encapsulation. This router service application can be added to the upgraded relay to enable the upgraded relay to effect extended tunnels for multi-hop encapsulation.

Operation of a cellular communication system that utilizes moving relays as well as a hierarchical cellular network is described in PCT Application No. PCT/IL2011/000096 entitled "Cellular communication system with moving base stations and methods and apparatus useful in conjunction therewith" filed on Jan. 27, 2011 published as Published PCT Application No. WO/2011/092698. The moving relays described in the above publication are useful in the present application except that as described herein, each moving relay rather than including a single mobile station functionality, a single base station functionality and a single relay resource manager e.g. radio resource manager, includes more than one mobile station functionality and/or more than one base station functionality. The following embodiments inter alia are known in the art by virtue of being described in the above publication:

Embodiment 1. A moving cellular communication system comprising:

a plurality of moving relays each including base station functionality, a radio manager and mobile station functionality, all co-located, wherein each base station functionality is operative to communicate via antennae with at least one mobile station thereby to define a first radio link there between, and wherein each base station functionality has a physical connection to its co-located radio manager, wherein each mobile station functionality communicates via antennae with a unit which has base station functionality thereby to define a second radio link, wherein the radio manager in each individual moving relay comprises:
  a radio resource manager; and
  functionality for exchanging information with radio managers included in moving relays other than said individual moving relay, wherein said information is used by said radio resource manager to select, for at least one individual mobile station seeking to be served, one of:
  a static base station; and
  a base station functionality,
to which to connect said individual mobile station in order to provide cellular communication services thereto.

Embodiment 2. A system according to embodiment 1 operative in conjunction with a cellular network including a core device, at least one static base station, and a population of mobile stations communicating via antennae with at least one of the base stations, wherein at least one topological change in said system occurs dynamically, said topological change comprises a dynamic change in at least one connection between a moving relay and at least one of a moving relay and a static base station.

Embodiment 3. A system according to embodiment 2 wherein at least one radio resource manager locally stores at least some of the information it uses to make a decision regarding selection of a cellular communication service provider for an individual mobile station seeking to be served, even after said decision has been made, thereby to generate a database co-located with said radio resource manager.

Embodiment 4. A system according to embodiment 1 wherein said information used by said radio resource manager includes information obtained from its co-located base station functionality.

Embodiment 5. A system according to embodiment 1 or embodiment 4 wherein said information used by said radio resource manager includes information obtained from its co-located mobile station functionality.

Embodiment 6. A system according to embodiment 5 wherein said information obtained from said co-located mobile station functionality is derived from at least one measurement of at least one characteristic of said second radio link.

Embodiment 7. A system according to embodiment 6 wherein said functionalities are provided in accordance with a cellular communication standard and wherein said information includes information provided by said mobile station functionality in accordance with said standard.

Embodiment 8. A system according to embodiment 7 wherein said cellular communication standard comprises 3GPP E-UTRAN LTE.

Embodiment 9. A system according to embodiment 8, where the information includes at least one of RSSI, RSRP, RSRQ.

Embodiment 10. A system according to embodiment 1 wherein each said moving relay and each said mobile station constitutes a cellular communication node and wherein said links generate routes interconnecting said nodes and wherein at least one radio resource manager residing at an individual node is operative to compute a route quality parameter characterizing quality of at least one individual route passing through said individual node, by combining information pertaining to links along said individual route.

Embodiment 11. A system according to embodiment 10 wherein said radio resource manager operative to compute a route quality parameter combines information pertaining to links along said individual route by computing a minimum from among values characterizing respective qualities of all links forming said individual route.

Embodiment 12. A system according to embodiment 10 wherein said system is operative in conjunction with a cellular network including a core device, at least one static base station, and a population of mobile stations communicating via antennae with at least one of the base stations, and wherein said individual route comprises a route connecting said individual node to at least one of the static base stations.

Embodiment 13. A system according to embodiment 1 wherein said system is operative in conjunction with a static network including a core device, at least one static base station, and a population of mobile stations communicating via antennae with at least one of the base stations and wherein each individual radio manager that does not have a sufficiently high quality connection to the static network may provide communication, via said individual radio manager's co-located base station functionality, between mobile stations that are connected to said co-located base station functionality.

Embodiment 14. A system according to embodiment 13 wherein said system is operative in conjunction with a static network including a core device, at least one static base station, and a population of mobile stations communicating via antennae with at least one of the base stations and wherein each radio manager that does not have a connection to the static network may provide communication, via said individual radio manager's co-located base station functionality, between mobile stations that are connected to said co-located base station functionality.

Embodiment 15. A system according to embodiment 1 wherein at least one individual radio manager may provide communication, via at least one base station functionality linked to said radio manager, between mobile stations that are connected to said at least one base station functionality.

Embodiment 16. A system according to embodiment 1 wherein each resource manager is operative to selectably establish communication between at least one mobile station connected to its co-located base station functionality and at least one mobile station connected to a moving relay to which said resource manager's co-located mobile station functionality is linked via a route.

Embodiment 17. A system according to embodiment 16 wherein said route includes a plurality of links.

Embodiment 18. A system according to embodiment 10 wherein said radio resource manager residing at said individual node computes a plurality of route quality parameters for a corresponding plurality of route alternatives.

Embodiment 19. A system according to embodiment 18 wherein said radio resource manager provides said plurality of route quality parameters to an individual mobile station connected to the base station functionality co-located with said radio resource manager.

Embodiment 20. A system according to embodiment 19 wherein said individual mobile station is operative, when in a mode in which it is its own decision to which unit having base station functionality it is to be connected, to make said decision based at least in part on said plurality of route quality parameters.

Embodiment 21. A system according to embodiment 6 wherein said information obtained from said co-located mobile station functionality includes said at least one measurement itself.

Embodiment 22. A system according to embodiment 4 wherein said information obtained from said co-located base station functionality is derived from at least one measurement of at least one characteristic of said first radio link.

Embodiment 23. A system according to embodiment 22 wherein said information obtained from said co-located base station functionality includes said at least one measurement itself.

Embodiment 24. A system according to embodiment 8 or embodiment 9 where the information includes a rsSINR (reference signal SINR) metric.

Embodiment 25. A system according to embodiment 1 in which an individual mobile station is connected to an individual base station functionality and wherein a decision to transfer said individual mobile station away from said individual base station functionality is made by a resource manager co-located with said individual base station functionality.

Embodiment 26. A system according to embodiment 1 and also comprising a cellular network including a core device, at least one static base station, and a population of mobile stations communicating via antennae with at least one of the base stations.

Embodiment 27. A system according to embodiment 26 and also comprising a relay network manager (DisNetRM) located at a static network core device.

Embodiment 28. A system according to embodiment 1 wherein, for at least one mobile station functionality in at least one individual moving relay, said unit which has base station functionality comprises a base station functionality of a moving relay other than said individual moving relay.

Embodiment 29. A system according to embodiment 1 operative in conjunction with a cellular network including a core device, at least one static base station, and a population of mobile stations communicating via antennae with at least one of the base stations,
moving relay, said unit which has base station functionality comprises said static base station.

Embodiment 30. A system according to embodiment 1 wherein said information, but for said exchanging, is accessible to only a subset of said radio managers.

Embodiment 31. A system according to embodiment 1 wherein said information comprises link information characterizing at least one of said radio links.

Embodiment 32. A system according to embodiment 28 wherein for the mobile station functionality co-located with said moving relay other than said individual moving relay, said unit which has base station functionality also comprises a base station functionality of a moving relay rather than a static base station, thereby to provide multi-hop capability to said system.

Embodiment 33. A system according to embodiment 27 in which an individual mobile station is connected to an individual base station functionality and wherein a decision to transfer said individual mobile station away from said individual base station functionality is made centrally by said relay network manager (DisNetRM)

Embodiment 34. A system according to embodiment 20 and also comprising a cellular network including a core device, at least one static base station, and a population of mobile stations communicating via antennae with at least one of the base stations wherein said individual mobile station decides to establish connection with the unit having base station functionality which, according to said plurality of route quality parameters, provides said individual mobile station with the best route to one of the static base stations.

Embodiment 35. A mobile communication network system operative in conjunction with a core network including a core device and at least one static base station, the system comprising:
  a plurality of base stations; and
  a population of mobile stations communicating via antennae with the base stations;
  the base stations including at least one moving base station which communicates via antennae with the mobile stations and includes base station functionality, a first radio manager and mobile station functionality all co-located with the base station functionality,
  the base station functionality having a physical back-connection to the first radio manager, the first radio manager having a physical connection with the mobile station functionality, the mobile station functionality communicating via antennae with at least one selectable static base station,
  wherein the first radio manager comprises:
    a radio resource manager; and
    functionality for receiving information from, and sending information to, other radio managers, respectively co-located with other moving base stations, and for using the information to determine whether to reject at least one mobile station seeking to be served by an individual base station associated with the individual co-located radio manager,
  wherein the information used to determine whether to reject includes at least one of the following:
    location of said at least one moving base station; and
    statistics re measurements of link quality.

Embodiment 36. A system according to embodiment 35 wherein said information comprises information regarding qualities of respective connections of respectively co-located radio managers back to the core network, which is provided by respectively co-located radio managers via a selected one of:
  a static base station from among the at least one static base station of the core network; and
  a moving base station capable of providing service to the individual radio manager's co-located mobile device.

Embodiment 37. A system according to embodiment 35 wherein said information regarding quality of its own connection back to the core network is provided by its own co-located mobile station.

Embodiment 38. A system according to embodiment 35 wherein said information includes information regarding channel quality which other base stations are able to provide mobile stations in the vicinity of the individual co-located radio manager and which is provided by reports generated by said mobile stations in said vicinity.

Embodiment 39. A system according to embodiment 35 wherein said information regarding quality of service available from its own base station for mobile stations in the vicinity of the individual co-located radio manager is provided by its own co-located mobile station.

Embodiment 40. A system according to embodiment 35 wherein said other radio manager is operative to compute, for at least one individual mobile station, route comparison information including a plurality of routes of base stations via which the individual mobile station may communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 41. A system according to embodiment 40 wherein said parameter is based upon a minimum SNR (signal noise ratio) value, over sections which together compose a route, each section having its own SNR (signal noise ratio) value.

Embodiment 42. A system according to embodiment 40 wherein said parameter characterizing route quality is a combination of measured qualities of route sections and fluctuations thereof such that route sections with largely fluctuating quality measurements are devalued due to their unpredictability.

Embodiment 43. A system according to embodiment 35 wherein at least one individual co-located radio manager includes a mobile-to-mobile direct communication facilitation functionality operative to provide direct communication, not requiring said core network, between a plurality of mobile devices in said individual radio manager's vicinity.

Embodiment 44. A system according to embodiment 35 wherein said moving base station observes a silence period during which it refrains from transmitting to its own co-located mobile station.

Embodiment 45. A system according to embodiment 44 wherein at least one characteristic of said silence period is dynamically determined by the moving base station's co-located radio manager.

Embodiment 46. A system according to embodiment 45 wherein said characteristic comprises a zone in which silence is observed which is defined over at least one of a frequency band and a time window.

Embodiment 47. A system according to embodiment 35 wherein said network comprises a tactical E-UTRAN network.

Embodiment 48. A system according to embodiment 35 wherein if a multi-hop communication route is used, in which a relay R that is connected to the core network via another relay A, relay R sends a message to a backhauling relay that R is A's anchor.

Embodiment 49. A system according to embodiment 35 wherein said static base station is co-located with said core device.

Embodiment 50. A system according to embodiment 35 wherein said physical back-connection comprises an Ethernet back-connection.

Embodiment 51. A system according to embodiment 35 wherein said radio resource manager comprises an E-UTRAN radio resource manager.

Embodiment 52. A mobile communication networking method comprising:
  providing a core network including a core device and at least one static base station; a plurality of base stations; and a population of mobile stations communicating via antennae with the base stations;
  the base stations including at least one moving base station which communicates via antennae with the mobile stations and includes base station functionality, a first radio manager and mobile station functionality all co-located with said base station functionality,
  the base station functionality having a physical back-connection to the first radio manager, the first radio manager having a physical connection with said mobile station functionality, the mobile station functionality communicating via antennae with at least one selectable static base station, wherein said first radio manager comprises a radio resource manager; and functionality for receiving information from, and sending information to, other radio managers, respectively co-located with other moving base stations; and using said information to determine whether to reject at least one mobile station seeking to be served by an individual base station associated with said first radio manager.

Embodiment 53. A system according to embodiment 35 wherein users are shown a good location for Quality Grade Result (QGR).

Embodiment 54. A system according to embodiment 53 wherein statistical measurements of a co-located MS in each at least one relay are attached to location results of the relay and wherein said system includes at least one relay radio manager (rRM) having a functionality that computes and indicates to the user locations with good QGC (quality grade control).

Embodiment 55. A system according to embodiment 48 wherein the backhauling relay becomes aware that another relay is connected to it and finds a good place to remain.

Embodiment 56. A system according to embodiment 35 wherein said information includes information regarding qualities of other base stations' respective connections back to the core network.

Embodiment 57. A system according to embodiment 35 wherein said information includes information regarding quality of the first radio manager's moving base station's connection back to the core network.

Embodiment 58. A system according to embodiment 35 wherein said information includes information regarding channel qualities which said first radio manager's own base station, and base stations other than said first radio manager's own base station, are respectively able to provide, to mobile stations in the vicinity of the first radio manager.

Embodiment 59. A method according to embodiment 52 wherein said information includes information regarding qualities of other base stations' respective connections back to the core network.

Embodiment 60. A method according to embodiment 52 wherein said information includes information regarding quality of the first radio manager's moving base station's connection back to the core network.

Embodiment 61. A method according to embodiment 52 wherein said information includes information regarding channel qualities which said first radio manager's own base station, and base stations other than said first radio manager's own base station, are respectively able to provide, to mobile stations in the vicinity of the first radio manager.

Embodiment 62. Combinations of embodiments with other embodiments.

Embodiment 63. A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:
a radio resource manager; and
functionality for receiving information from, and for sending information to, other radio managers, respectively co-located with other moving base stations, and for using the information to determine whether to reject at least one mobile station seeking to be served by an individual base station associated with the individual co-located radio manager.

Embodiment 64. A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:
a radio resource manager; and
functionality for receiving information from, and sending information to, other radio managers, respectively co-located with other moving base stations, wherein at least one radio manager is operative to compute, for at least one individual moving base station, route comparison information including a plurality of routes of base stations via which the individual moving base station may communicate with the core network and at least one parameter characterizing the relative quality of each of said routes and wherein said individual moving base station connects to a serving base station selected at least partly based on information indicative of said route comparison information, and wherein the plurality of routes of base stations via which the individual moving base station may communicate with the core network includes at least one route characterized by multi-hop backhauling.

Embodiment 65. A system according to embodiment 63 wherein said mobile station seeking to be served by said individual base station includes a mobile station currently being served by said individual base station.

Embodiment 66. A system according to embodiment 63 wherein said individual base station is co-located with the individual co-located radio manager.

Embodiment 67. A system according to embodiment 63 wherein said individual base station is served by the individual co-located radio manager.

Embodiment 68. A system according to embodiment 63 wherein said functionality is also operative to determine a base station other than said individual base station, which is more suitable than said individual base station to serve said mobile station seeking to be served.

Embodiment 69. A system according to embodiment 63 wherein at least one radio manager is operative to compute, for at least one individual moving base station, route comparison information including a plurality of routes of base stations via which the individual moving base station may communicate with the core network and at least one parameter characterizing the relative quality of each of said routes and wherein said individual moving base station connects to a serving base station selected at least partly based on information indicative of said route comparison information.

Embodiment 70. A system according to embodiment 64 wherein each said other radio manager is operative to compute, for at least one individual mobile station, route comparison information including a plurality of routes of base stations via which the individual mobile station may communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 71. A system according to embodiment 64 wherein the radio manager computes said route comparison information for an individual moving base station served thereby whose mobile station functionality is communicating in idle mode, via antenna, with at least one selectable base station.

Embodiment 72. A system according to embodiment 64 wherein the radio manager computes said route comparison information for a moving base station co-located therewith whose mobile station functionality is communicating in active mode, via antenna, with at least one selectable base station.

Embodiment 73. A system according to embodiment 71 and wherein the individual moving base station camps on said serving base station selected at least partly based on said information indicative of said route comparison information.

Embodiment 74. A system according to embodiment 72 and wherein the individual moving base station is handed over to said serving base station selected at least partly based on said information indicative of said route comparison information.

Embodiment 75. A system according to embodiment 63 and also comprising a core device and wherein the core device allocates constant communication session bandwidth between each mobile station functionality and the base station with which it is communicating so as to maintain a constant active mode of communication between each mobile station functionality and the base station.

Embodiment 76. A system according to embodiment 64 and also comprising a core device and wherein the core device allocates constant communication session bandwidth between each mobile station functionality and the base station with which it is communicating so as to maintain a constant active mode of communication between each mobile station functionality and the base station.

Embodiment 77. A mobile communication network system serving a population of mobile stations communicating via antennae with base stations, the system including:
- a plurality of base stations including at least one static base station and at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station; and
- a core device which allocates constant communication session traffic between each mobile station functionality and the base station with which it is communicating so as to maintain a constant active mode of communication between each mobile station functionality and the base station.

Embodiment 78. A system according to embodiment 56 wherein said other base stations include all base stations along a route connecting said moving base station and said core, via which route said core serves said moving base station.

Embodiment 79. A system according to embodiment 77 wherein said other base stations include all base stations along a route connecting said moving base station and said core, via which route said core serves said moving base station.

Embodiment 80. A system according to embodiment 64 wherein said information includes information regarding channel qualities which said first radio manager's own base station, and base stations other than said first radio manager's own base station, are respectively able to provide, to mobile stations in the vicinity of the first radio manager.

Embodiment 81. A system according to embodiment 63 wherein said functionality is operative for detecting the quality of each end-user section and the quality of each backhauling section according to mobile stations' and mobile station functionalities' measurements and for combining said qualities into quality grade results for a current route and for alternative routes for at least one mobile station.

Embodiment 82. A system according to embodiment 81 and wherein said quality grade results are broadcast to at least one mobile station.

Embodiment 83. A system according to embodiment 81 wherein at least one handover decision, to hand over a node from one base station to another, is made by taking into account, for at least one alternative route, the quality grade result of access and backhauling sections.

Embodiment 84. A system according to embodiment 81 wherein at least one cell admission decision is made by taking into account, for at least one alternative route, the quality grade result of access and backhauling sections.

Embodiment 85. A system according to embodiment 81 wherein at least one cell reselection decision is made by taking into account, for at least one alternative route, the quality grade result of access and backhauling sections.

Embodiment 86. A system according to embodiment 81 wherein said mobile stations' and mobile station functionalities' measurements include RSRP.

Embodiment 87. A system according to embodiment 81 wherein said mobile stations' and mobile station functionalities' measurements include RSRI.

Embodiment 88. A system according to embodiment 81 wherein said mobile stations' and mobile station functionalities' measurements include RSRQ.

Embodiment 89. A system according to embodiment 63 wherein each radio manager uses measurements from at least one other radio manager over a sub-network, and at least one of RSRP, RSRI and RSRQ measurements from at least one of its co-located mobile station functionality and a mobile station, to build a radio resource measurements table.

Embodiment 90. A system according to embodiment 89 wherein at least one of said measurements is distributed by broadcast message type to all radio managers.

Embodiment 91. A system according to embodiment 81 wherein the Quality Grade Result (QGR) of all alternative routes is distributed to mobile stations using a broadcast message.

Embodiment 92. A system according to embodiment 91 wherein the broadcast message relating to each individual base station is sent to all mobile stations camping on said individual base station.

Embodiment 93. A system according to embodiment 64 wherein said information includes information regarding qualities of other base stations' respective connections back to the core network.

Embodiment 94. A system according to embodiment 63 wherein said information is transmitted between "colleague" radio managers via radio.

Embodiment 95. A system according to embodiment 63 wherein at least one radio manager "masquerades" as a base station by sending a request to a mobile station functionality to execute an NMR (Network Measurement Report) measurement.

Embodiment 96. A system according to embodiment 63 wherein said information includes information regarding quality which the first radio manager's mobile station functionality would be served by each base station capable of serving the first radio manager's mobile station functionality.

Embodiment 97. Combinations of a subset of features of certain embodiments with a subset of features of other embodiments.

Embodiment 98. A system according to embodiment 1 and wherein said radio manager includes an in-band multi-hop backhauling functionality.

Embodiment 99. A system according to embodiment 98 wherein said in-band multi-hop backhauling functionality is operative to enhance immunity due to interference by creating new alternative routes to replace routes that are dropped due to interference, wherein each new alternative route includes a section between the end-user mobile station and mobile relay it is connected to, and a backhauling section, including the links between the mobile relays that take part as nodes in the route.

Embodiment 100. A system according to embodiment 1 wherein backhauling connectivity is provided by utilizing multi-hop routes between said moving relays.

Embodiment 101. A system according to embodiment 1 wherein backhauling of said moving relays comprises in-band multi-hop backhauling.

Embodiment 102. A system according to embodiment 1 wherein for at least one mobile station functionality in at least one individual moving relay, said unit which has base station functionality comprises an LTE base station functionality.

Embodiment 103. A system according to embodiment 1 wherein for at least one mobile station functionality in at least one individual moving relay, said unit which has base station functionality comprises a 2G base station functionality.

Embodiment 104. A system according to embodiment 1 wherein for at least one mobile station functionality in at least one individual moving relay, said unit which has base station functionality comprises a 3G base station functionality.

Any suitable IP connectivity gateway may be used herein, not being limited to what is specifically shown and described herein, such as but not limited to one of: an IP-connectivity GW in LTE; one of a P-Gateway, S-Gateway, PIS-Gateway and Access-Gateway; in 3G GGSN, an SGSN, in WiMAX, an ASN-Gateway in CSN;

Any suitable mobility management entity may be used herein, not being limited to what is specifically shown and described herein, such as but not limited to one of: an LTE MME, a 3G RNC, and a WiMAX ASN.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The present invention has been described with a certain degree of particularity, but those versed in the art will readily appreciate that various alternations and modifications may be carried out without departing from the scope of following claims.

The invention claimed is:

1. A moving cellular communication system comprising:
at least one upgraded moving relay including at least one base station functionality and at least two mobile station functionalities, each of which includes a modem, and a relay resource manager, all co-located, wherein the relay resource manager includes a routing and quality-of-service subsystem operative to communicate with at least one base station functionality and at least one of said mobile station functionalities and wherein the relay resource manager also includes a tunneling subsystem operative to provide tunnels for multi-hop encapsulation,
wherein each base station functionality of said upgraded moving relay is operative to communicate via antennae with at least one mobile station thereby to define at least one first radio link therebetween,
and wherein each base station functionality has a connection to its co-located relay resource manager,
wherein each mobile station functionality from among said at least two mobile station functionalities of said upgraded moving relay communicates via antennae with a unit which has base station functionality thereby to define at least two second radio links, respectively,
wherein the relay resource manager in at least one individual moving relay comprises:
a radio resource manager; and
functionality for exchanging information with relay resource managers included in moving relays other than said individual moving relay,
wherein the relay resource manager and at least some mobile stations are not all aboard a single moving object
wherein a Virtual S-GW (serving gateway) and Virtual mobility management entity (MME) are provided having corresponding standard S-GW and MME interfaces with the base station functionality and wherein when a remote core is used by the relay, the Virtual S-GW and Virtual MME emulate core functions as proxies thereby to allow the base station functionality to operate smoothly and seamlessly despite remoteness of the core.

2. The system according to claim 1, wherein at least one of said mobile station functionalities within an upgraded moving relay serves as a backup to other mobile station functionality of the same upgraded moving relay, and said relay resource manager is operative to switch communication from said other mobile station functionality to said backup mobile station functionality in response to meeting a mobile station handover criterion.

3. A method for providing moving cellular communication, the method comprising:
providing at least one upgraded moving relay including
at least one base station functionality,
a relay resource manager, and
at least two mobile station functionalities each of which includes a modem,
all co-located,
wherein each base station functionality of said upgraded moving relay is operative to communicate via antennae with at least one mobile station thereby to define at least one first radio link therebetween,
and wherein each base station functionality has a connection to its co-located relay resource manager,
wherein each mobile station functionality from among said at least two mobile station functionalities of said upgraded moving relay communicates via antennae with a unit which has base station functionality thereby to define at least two second radio links, respectively,
wherein providing the relay resource manager in each individual moving relay comprises:
providing a radio resource manager which includes a tunneling subsystem operative to provide tunnels for multi-hop encapsulation; and
providing functionality for exchanging information with relay resource managers included in moving relays other than said individual moving relay, wherein the relay resource manager and at least some mobile stations are not all aboard a single moving object wherein a Virtual S-GW (serving gateway) and Virtual mobility management entity (MME) are provided having corresponding standard S-GW and MME interfaces with the base station functionality and wherein when a remote core is used by the relay, the Virtual S-GW and Virtual MME emulate core functions as proxies thereby to allow the base station functionality to operate smoothly and seamlessly despite remoteness of the core.

4. The method according to claim 3 and also comprising supporting cellular communication over a many-to-one topology.

5. The method according to claim 3 and also comprising using said two mobile station functionalities to support cellular communication over a many-to-many topology.

6. The method according to claim 3 and also comprising using said two mobile station functionalities to perform at least one backhauling operation at a data rate which exceeds a data rate of a backhauling operation performed using only one of the two mobile station functionalities.

7. The method according to claim 3 and also comprising using said two mobile station functionalities to provide a larger number of bearers than would be available if cellular communication were supported by only one of the two mobile station functionalities.

8. The method according to claim 3 and also comprising using said two mobile station functionalities to provide hot redundancy.

9. The method according to claim 8 wherein said hot redundancy comprises sending backhauling data using said at least two mobile station functionalities a plurality of times rather than only once.

10. The method according to claim 3 and also comprising using said two mobile station functionalities to provide a plurality of alternate routes between mobile stations served by said at least one base station functionality, and a core of a cellular network to which the moving relay belongs.

11. The moving cellular communication system according to claim 1 wherein said relay resource manager also includes a stand-alone subsystem.

12. The moving cellular communication method according to claim 3 wherein said relay resource manager also includes a stand-alone subsystem.

13. A computer program product, comprising a non-transitory computer readable medium, which is not a transitory signal, having a computer readable program code embodied therein, said computer readable program code adapted to be executed to implement a method for providing moving cellular communication, the method comprising:
providing at least one upgraded moving relay including
at least one base station functionality,
a relay resource manager which includes a tunneling subsystem operative to provide tunnels for multi-hop encapsulation, and
at least two mobile station functionalities each of which includes a modem,
all co-located,
wherein each base station functionality of said upgraded moving relay is operative to communicate via antennae with at least one mobile station thereby to define at least one first radio link therebetween,
and wherein each base station functionality has a connection to its co-located relay resource manager, wherein each mobile station functionality from among said at least two mobile station functionalities of said upgraded moving relay communicates via antennae with a unit which has base station functionality thereby to define at least two second radio links, respectively, wherein providing the relay resource manager in each individual moving relay comprises:
providing a radio resource manager; and
providing functionality for exchanging information with relay resource managers included in moving relays other than said individual moving relay, wherein the relay resource manager and at least some mobile stations are not all aboard a single moving object wherein a Virtual S-GW (serving gateway) and Virtual mobility management entity (MME) are provided having corresponding standard S-GW and MME interfaces with the base station functionality and wherein when a remote core is used by the relay, the Virtual S-GW and Virtual MME emulate core functions as proxies thereby to allow the base station functionality to operate smoothly and seamlessly despite remoteness of the core.

14. The system according to claim 1 wherein said at least two mobile station functionalities operate substantially simultaneously.

15. The system according to claim 11 wherein said at least two mobile station functionalities operate substantially simultaneously.

16. The method according to claim 12 wherein said at least two mobile station functionalities operate substantially simultaneously.

17. The product according to claim 13 wherein said at least two mobile station functionalities operate substantially simultaneously.

18. The product according to claim 13 wherein said relay resource manager also includes a stand-alone subsystem.

19. The system according to claim 1 wherein the radio resource manager is operative to communicate with at least one relay resource manager included in moving relays other than said individual moving relay.

20. The method according to claim 3 and wherein each mobile station functionality also includes an antenna and a radio frequency front-end.

21. The system according to claim 11 wherein said base station functionality comprises software implemented functionality enabling relays to converse and/or exchange digital information between them or with a terrestrial network, via communication paths defined between respective pairs of base and mobile stations.

22. The system according to claim 1 wherein the Routing & QoS (quality of service) subsystem communicates with the base station functionality using an M&C (Management and Control) interface to command a change in base station functionality parameters including PLMN (Public Land Mobile Network).

23. The system according to claim 1 wherein the Routing & QoS (quality of service) subsystem communicates with the base station functionality using an M&C (Management and Control) interface to command the base station functionality to initiate a handover of at least one mobile station attached to said relay.

24. A system according to claim 1 wherein at least one moving relay gives different priorities to different mobile stations served thereby by using different bearers with different prioritizations that are allocated to a single mobile station functionality.

25. A system according to claim 1 wherein said functionalities are provided in accordance with a cellular communication standard and wherein said information includes information provided by said mobile station functionality in accordance with said standard.

26. A system according to claim 1 wherein said mobile station functionality comprises software implemented functionality to enable the relay to function as a mobile communication device.

27. A system according to claim 26 wherein said mobile station functionality comprises an application processor.

* * * * *